United States Patent
He et al.

(10) Patent No.: US 10,776,605 B2
(45) Date of Patent: Sep. 15, 2020

(54) MULTIFUNCTION FINGERPRINT SENSOR

(71) Applicant: SHENZHEN GOODIX TECHNOLOGY CO., LTD., Shenzhen (CN)

(72) Inventors: Yi He, San Diego, CA (US); Bo Pi, San Diego, CA (US)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/445,180

(22) Filed: Jun. 18, 2019

(65) Prior Publication Data

US 2019/0303642 A1   Oct. 3, 2019

Related U.S. Application Data

(63) Continuation of application No. 15/137,918, filed on Apr. 25, 2016, now Pat. No. 10,325,142.

(Continued)

(51) Int. Cl.
*G06K 9/00* (2006.01)

(52) U.S. Cl.
CPC ......... *G06K 9/0012* (2013.01); *G06K 9/0002* (2013.01); *G06K 9/0004* (2013.01)

(58) Field of Classification Search
CPC ............. G06K 9/0002; G06K 9/00087; G06K 9/00912; G06F 3/0414
See application file for complete search history.

(56) References Cited

U.S. PATENT DOCUMENTS

| 5,088,817 A | 2/1992 | Igaki et al. |
| 7,003,237 B2 | 2/2006 | Miyamoto et al. |

(Continued)

FOREIGN PATENT DOCUMENTS

| CN | 1392507 A | 1/2003 |
| CN | 1404002 A | 3/2003 |

(Continued)

OTHER PUBLICATIONS

Lisa M. Richards et al: "Low-cost laser speckle contrast imaging of blood flow using a webcam", Biomedical optics express, vol. 4, No. 10, Sep. 26, 2013, p. 2269, ISSN: 2156-7085, DOI: 10.1364/BOE.4.002269.

(Continued)

*Primary Examiner* — Mia M Thomas

(57) ABSTRACT

In one aspect, a fingerprint sensor device includes sensing circuitry to generate a sensor signal responsive to detecting a contact input associated with a fingerprint. The sensing circuitry includes a fingerprint sensor to detect the contact input and generate a signal indicative of an image of the fingerprint. The sensing circuitry includes a live finger sensor to generate a signal indicative of an identification of the fingerprint as belonging to a live finger. The generated sensor signal includes the signal indicative of the image of the fingerprint and the signal indicative of the identification of the fingerprint as belonging to a live finger. The fingerprint sensor device includes processing circuitry communicatively coupled to the sensing circuitry to process the generated sensor signal to determine whether the contact input associated with the fingerprint belongs to a live finger.

20 Claims, 19 Drawing Sheets

Related U.S. Application Data

(60) Provisional application No. 62/151,903, filed on Apr. 23, 2015.

(56) References Cited

U.S. PATENT DOCUMENTS

| | | | |
|---|---|---|---|
| 7,031,502 | B1 | 4/2006 | Mil'shtein et al. |
| 7,366,331 | B2 | 4/2008 | Higuchi |
| 7,751,595 | B2 | 7/2010 | Russo |
| 8,180,120 | B2 * | 5/2012 | Hook ............... G06K 9/00906 382/116 |
| 8,913,800 | B2 | 12/2014 | Rowe |
| 9,098,756 | B2 | 8/2015 | Endoh |
| 9,342,727 | B2 | 5/2016 | Cohen et al. |
| 9,495,575 | B2 | 11/2016 | Kim et al. |
| 9,582,705 | B2 | 2/2017 | Du et al. |
| 9,665,763 | B2 | 5/2017 | Du et al. |
| 2002/0015024 | A1 | 2/2002 | Westerman et al. |
| 2003/0044051 | A1 | 3/2003 | Fujieda |
| 2006/0115128 | A1 | 6/2006 | Mainguet |
| 2007/0211926 | A1 | 9/2007 | Shinzaki et al. |
| 2009/0123041 | A1 | 5/2009 | Tani |
| 2009/0166411 | A1 | 7/2009 | Kramer et al. |
| 2009/0232367 | A1 | 9/2009 | Shinzaki |
| 2010/0008552 | A1 | 1/2010 | Shin et al. |
| 2010/0240415 | A1 * | 9/2010 | Kim .................... G06F 3/03547 455/565 |
| 2011/0309482 | A1 | 12/2011 | Salatino et al. |
| 2012/0257033 | A1 | 10/2012 | Rowe |
| 2013/0127790 | A1 * | 5/2013 | Wassvik ............... G06F 3/0416 345/175 |
| 2013/0258086 | A1 | 10/2013 | Erhart et al. |
| 2014/0355845 | A1 | 12/2014 | Benkley et al. |
| 2015/0078636 | A1 | 3/2015 | Carver et al. |
| 2015/0146944 | A1 | 5/2015 | Pi et al. |
| 2016/0224816 | A1 | 8/2016 | Smith et al. |
| 2016/0314334 | A1 | 10/2016 | He et al. |
| 2017/0032169 | A1 | 2/2017 | Pi et al. |
| 2017/0172462 | A1 * | 6/2017 | Alghazi .................. B62K 5/00 |
| 2017/0220838 | A1 | 8/2017 | He et al. |
| 2017/0220844 | A1 | 8/2017 | Jones et al. |
| 2017/0221960 | A1 | 8/2017 | Lin et al. |
| 2017/0270342 | A1 | 9/2017 | He et al. |
| 2017/0308729 | A1 * | 10/2017 | Chung ............... G06K 9/00912 |
| 2018/0005005 | A1 | 1/2018 | He et al. |
| 2018/0046281 | A1 | 2/2018 | Pi et al. |
| 2018/0059893 | A1 | 3/2018 | Xu et al. |
| 2018/0129798 | A1 | 5/2018 | He et al. |
| 2018/0173343 | A1 * | 6/2018 | Pi ........................ G06F 3/041 |
| 2018/0225498 | A1 | 8/2018 | Setlak |
| 2018/0260602 | A1 | 9/2018 | He et al. |
| 2018/0300530 | A1 | 10/2018 | Pi et al. |
| 2019/0034020 | A1 * | 1/2019 | He ......................... G06K 9/22 |

FOREIGN PATENT DOCUMENTS

| | | |
|---|---|---|
| CN | 1758265 A | 4/2006 |
| CN | 101079106 A | 11/2007 |
| CN | 101116087 A | 1/2008 |
| CN | 102509372 A | 6/2012 |
| CN | 103038782 A | 4/2013 |
| EP | 1708135 B1 | 5/2011 |
| JP | 2003-006627 A | 1/2003 |
| JP | 2003-075135 A | 3/2003 |
| JP | 4468896 B2 | 5/2010 |
| KR | 10-2013-0043161 A | 4/2013 |

OTHER PUBLICATIONS

Stern m. D. Et al: "Continuous measurement of tissue blood flow by laser-doppler spectroscopy", American Journal of Physiology: Heart and Circulatory Physiology, American Physiological Society, vol. 1, No. 4, Apr. 1, 1997, pp. h441-h448, issn: 0363-6135.

* cited by examiner

83- Metal ring
97- Light sources
105- Light beams come out from the light sources
113- Photo diodes
115- Mesh color layers of the sensor cover
117- Finger scattered light transmits through the mesh color layers to reach the photo diodes
119- Finger
121- Sensor cover with mesh color layers
131- Photo diodes position

MULTIFUNCTION FINGERPRINT SENSOR

CROSS-REFERENCE TO RELATED APPLICATIONS

This application is a continuation of U.S. patent application Ser. No. 15/137,918, filed on Apr. 25, 2016, which claims priority to U.S. Provisional Patent Application No. 62/151,903, filed on Apr. 23, 2015. The entire content of the before-mentioned patent application is incorporated by reference as part of the disclosure of this document. All of the afore-mentioned patent applications are hereby incorporated by reference in their entireties.

TECHNICAL FIELD

This patent document generally relates to fingerprint recognition for securely accessing an electronic device that includes mobile and wearable devices.

BACKGROUND

Electronic devices including portable or mobile computing devices, such as laptops, tablets, smartphones, and gaming systems can employ user authentication mechanisms to protect personal data and prevent unauthorized access. User authentication on an electronic device can be carried out through one or multiple forms of biometric identifiers, which can be used alone or in addition to conventional password authentication methods. A popular form of biometric identifiers is a person's fingerprint pattern. A fingerprint sensor can be built into the electronic device to read a user's fingerprint pattern so that the device can only be unlocked by an authorized user of the device through authentication of the authorized user's fingerprint pattern.

SUMMARY

This patent document describes technology for providing devices, systems, and techniques that perform human fingerprint detection and authentication for authenticating an access attempt to a locked device including a mobile device equipped with a fingerprint detection device. The fingerprint sensor device described in this patent document is a multifunction fingerprint sensor device that combines sensing of a fingerprint from a live person with additional biometric data analysis, such as heartbeat or heart rate sensing, real-time finger color sensing, fingerprint image details movement sensing, and blood cell movement sensing. The ability to differentiate between a fingerprint from a live person and a copy of a person's fingerprint (e.g., a photocopy) can deter or prevent unauthorized access to the electronic device. The ability to detect additional biometric analysis, such as heartbeat or heartrate detection can enhance the ability to detect a fingerprint of a live person and provide valuable health monitoring.

In one aspect, a fingerprint sensor device includes sensing circuitry to generate a sensor signal responsive to detecting a contact input associated with a fingerprint. The sensing circuitry includes a fingerprint sensor to detect the contact input and generate a signal indicative of an image of the fingerprint. The sensing circuitry includes a live finger sensor to generate a signal indicative of an identification of the fingerprint as belonging to a live finger. The generated sensor signal includes the signal indicative of the image of the fingerprint and the signal indicative of the identification of the fingerprint as belonging to a live finger. The fingerprint sensor device includes processing circuitry communicatively coupled to the sensing circuitry to process the generated sensor signal to determine whether the contact input associated with the fingerprint belongs to a live finger.

The fingerprint sensor device can be implemented in various ways to include one or more of the following features. The fingerprint sensor includes a capacitive sensor, an optical sensor, or both capacitive and optical sensors. The fingerprint sensor can obtain information regarding ridges and valleys of the fingerprint. The live finger sensor can analyze the signal indicative of the image of the fingerprint to identify dynamic changes in image details over a period of time. The live finger sensor includes a light source and a light detector. The light source can include a light emitting diode or a laser diode. The light detector can include a photodiode. The light source can emit light toward a source of the fingerprint. The light detector can detect scattered light that is scattered from the source of the fingerprint responsive to the emitted light.

In another aspect, an electronic device includes a central processor and a fingerprint sensor device in communication with the central processor. The fingerprint sensor device includes sensing circuitry to generate a sensor signal responsive to detecting a contact input associated with a fingerprint. The sensing circuitry includes a fingerprint sensor to detect the contact input and generate a signal indicative of an image of the fingerprint. The sensing circuitry includes a live finger sensor to generate a signal indicative of an identification of the fingerprint as belonging to a live finger. The generated sensor signal includes the signal indicative of the image of the fingerprint and the signal indicative of the identification of the fingerprint as belonging to a live finger. The fingerprint sensor device includes processing circuitry communicatively coupled to the sensing circuitry to process the generated sensor signal to determine whether the contact input associated with the fingerprint belongs to a live finger. The fingerprint sensor device includes an interface to bridge signal flow between the fingerprint sensor device and the central processor of the electronic device.

The electronic device can be implemented in various ways to include one or more of the following features. The electronic device can include a smartphone, a tablet computer, a laptop computer, or a wearable device.

In another aspect, a method of detecting a live finger during a fingerprint scan includes detecting, by a fingerprint sensor, a contact input associated with a source of a fingerprint. The method includes generating an image signal from the fingerprint sensor responsive to the detected contact input. The generated image signal from the fingerprint sensor is indicative of one or more images of the fingerprint. The method includes generating, by a live finger sensor, a live finger detection signal indicative of whether a source of the fingerprint making the contact is a live finger. The method includes processing, by processing circuitry, the generated image signal and the live finger detection signal to determine whether the detected contact and the associated one or more fingerprint images are from a live finger.

The method can be implemented to include one or more of the following features. Processing the generated live finger detection signal can include analyzing fingerprint image dynamics. The fingerprint image dynamics can include a change in signal amplitude or bright points coordinates. Generating the image signal can include capturing a sequence of fingerprint images. Generating the live finger detection signal can include identifying changes in one or more image details over the sequence of captured fingerprint images.

In another aspect, a method for performing live finger detection includes detecting a contact input associated with a fingerprint by a fingerprint sensor. The method includes applying, by a live finger sensor, one or more wavelengths of light to a source of the detected contact input associated with the fingerprint. The method includes detecting, by the live finger sensor, scattered light that is scattered from the source of the contact input associated with a fingerprint responsive to the applied one or more wavelengths of light. The detected scattered light includes information on a material of the source of the detected contact input associated with the fingerprint. The method includes determining whether the source of the detected contact input associated with the fingerprint is a live finger based on the information included in the detected scattered light.

The method can be implemented in various ways to include one or more of the following features. The information on the material of the source of the detected contact input associated with the fingerprint can include information on blood cells, heartbeat, blood flow induced speckle patterns, or a Doppler frequency change.

In another aspect, an electronic device includes a protective cover; and a fingerprint sensor dispose near the protective cover. The fingerprint sensor includes a fingerprint sensor chip to scan a fingerprint; and a live finger sensor to obtain information from a source of the fingerprint, the information indicative of whether the source of the fingerprint is a live finger. The live finger sensor includes a light source to emit light of one or more wavelengths toward the source of the fingerprint, and a light detector to detect scattered light that is scattered from the source of the fingerprint responsive to the emitted light. The detected scattered light includes the information indicative of whether the source of the fingerprint is a live finger.

The electronic device can be implemented to include one or more of the following features. For example, the fingerprint sensor can include a pressure sensor. The fingerprint sensor can include flexible printed circuit (FPC) disposed over the pressure sensor. The fingerprint sensor can include an integrated circuit board disposed over the FPC. The light source and the light detector can be integrated with the integrated circuit board. The fingerprint sensor device can be disposed under the protective cover. The light source can include a light emitting diode or a laser diode. The light detector can include a photodiode. The light source can be integrated with the fingerprint sensor chip. The protective cover can include glass material that is at least partially transparent to the emitted light and the scattered light. The glass cover can include an emitted light path window for the emitted light from the light source to travel to the source of the fingerprint. The glass cover can include a scattered light path window for the scattered light from the source of the fingerprint to be received by the light detector. The fingerprint sensor device can include a colored epoxy material layer disposed over the fingerprint sensor chip. The fingerprint sensor device can include a metal ring structure disposed to surround the fingerprint sensor chip and under the colored epoxy material layer. The protective cover can be disposed to form a hole to receive the fingerprint sensor device within the hole of the protective cover. The fingerprint sensor device can include a metal ring, and the fingerprint sensor device can be disposed within the hole of the protective cover to form a gap between the metal ring and a side surface of the protective cover with the gap forming a light path for the emitted light emitted by the light source to reach the source of the fingerprint. The fingerprint sensor device can include a sensor cover. The sensor cover can be at least partially transparent to the emitted light and the scattered light. The sensor cover can include two layers of a material that is at least partially transparent to the emitted light and the scattered light. The sensor cover can include a color layer between the two layers of the material that is at least partially transparent to the emitted light and the scattered light. The sensor cover can include a mesh material.

The multifunction fingerprint sensor device of the disclosed technology can utilize a number of different fingerprint sensing technologies including optical sensing, self-capacitive sensing with active sensor pixels and amplification, or a combination of multiple fingerprint sensing technologies. The fingerprint sensor device incorporating self-capacitive sensing with active sensor pixels and amplification can potentially gain a number of valuable advantages. For example, because self-capacitive sensing with active sensor pixels and amplification eliminates the need for an excitation electrode external to the fingerprint sensor device, the entire fingerprint sensor device can be implemented to be disposed under a protective cover (e.g., sapphire). The under-the-cover implementation can protect the fingerprint sensor device from environmental hazards including the finger, moisture, dust, etc. Also, the self-capacitive sensing with active sensor pixels and amplification allows for selectively driving all sensor pixels in a scan row or column to increase the number of sensor pixels contributing to each read sensor signal. These and other potential advantages will be apparent from the following descriptions.

DETAILED DESCRIPTION

Electronic devices equipped with fingerprint authentication mechanisms may be hacked by malicious individuals who can obtain the authorized user's fingerprint, and copy the stolen fingerprint pattern on a carrier object that resembles a human finger, which can then be used to unlock the targeted device. Hence, the fingerprint pattern, although a unique biometric identifier, may not be by itself a completely reliable or secure identification. The techniques, devices and systems described in this document improve upon the fingerprint authentication technology used in existing electronic devices to potentially prevent a stolen fingerprint from being used to gain access to the targeted device.

Embodiments described in this document provide devices, systems, and techniques that implement various fingerprint sensor device for human fingerprint detection and authentication. Moreover, embodiments described in this document provide devices, systems, and techniques that implement various fingerprint sensor devices to determine whether a detected object belongs to a live human. The technology disclosed in this document can be combined with an additional measurement obtained from a person to combine with the person's fingerprint pattern as a combined authentication method to identify whether the authorized person is accessing the device.

Moreover, various examples of implementations of the disclosed technology provides for a fingerprint sensor device that can also detect additional biometric data, such as heartbeat or heartrate of a user during scanning of the fingerprint. Thus, the fingerprint sensor device of the disclosed technology is a multifunction fingerprint sensor device that can provide a secure access to an electronic device and provide additional biometric data analysis, such as heartbeat or heartrate sensing.

Fingerprint Sensor Circuitry and Live Finger Detection

Figure 1:
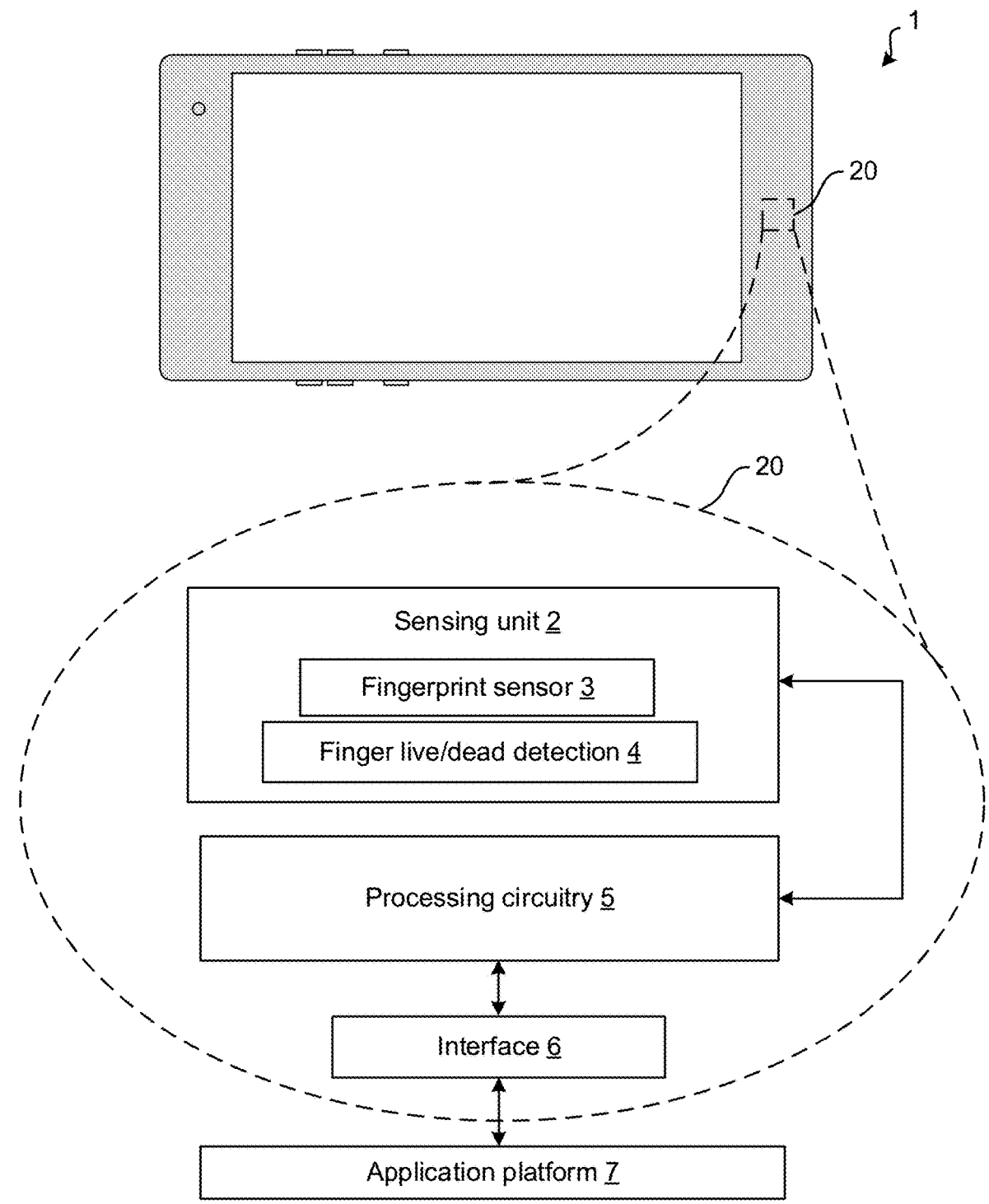
FIG. 1 is a block diagram showing an exemplary fingerprint sensor device implementing in a smartphone.

FIG. 1 is a block diagram showing an exemplary fingerprint sensor device 20 implementing in a smartphone 1. The fingerprint sensor device 20 includes a sensing unit or circuitry 2 that performs fingerprint scanning and live/dead finger judgment. The sensing unit 2 is communicatively coupled to processing circuitry 5 to handle signal flow from the sensing unit 2 and to process the signal associated with fingerprint scanning and live/dead fingerprint judgment, etc.

An interface 6 bridges signal flow between the fingerprint sensor device 20 and an application platform or a host device 7, which can include the smartphone 1. Examples of the application platform 7 include the smart phone 1, a tablet computer, a laptop computer, a wearable device, and other electronic device where a secure access is desired. For example, the interface 6 can communicate with a central processor (either directly or through other components, such as a bus or an interface) of the smartphone 1 to provide sensor data from the fingerprint sensor device 20 including fingerprint image data and information indicative of whether the detected fingerprint making the contact input belongs to a live finger.

The sensing unit 2 includes a fingerprint sensor 3 and a live finger sensor 4. The fingerprint sensor 3 can be implanted using one or a combination of available sensing techniques including self-capacitive sensing, mutual-capacitive sensing, optical sensing, or other sensing techniques. The live finger sensor 4 can include circuitry for analyzing fingerprint image dynamics. As described above, the fingerprint capacitive images obtained from the fingerprint sensor 3 carry the finger movement information, so that the image details, such as signal amplitude, and bright points coordinates, can be used to determine whether the finger touching the sensor device is alive. In some implementations, the live finger sensor 4 can include circuitry, such as optical sensors, for sensing additional biometric markers, such as heartbeat or heart rate from the scanned fingerprint. Examples of the fingerprint sensor 3 and the live finger sensor 4 are provided with respect to FIGS. 10A through 14D.

The live finger sensor 4 performs the live finger detection or judgment based on the fact that a living finger is moving, stretching, or pulsing when the blood flows through the user's body. The live finger sensor 4 can include a pressure sensor, an optical sensor, or other sensors that can detect the moving, stretching, or pulsing of a live finger. For example, an optical sensor can include a light source, such as a light emitting diode (LED) or a laser diode (LD) to emit light and a light detector, such as a photodiode to detect scattered light scattered from the finger responsive to the emitted light. When the light propagates through the finger tissues or the blood cells, the light is partially absorbed and partially scattered. The live finger movement or the blood flow causes a change in the light absorption cross-section. The photodiode detects this kind of change to detect a live finger.

Figure 2A:
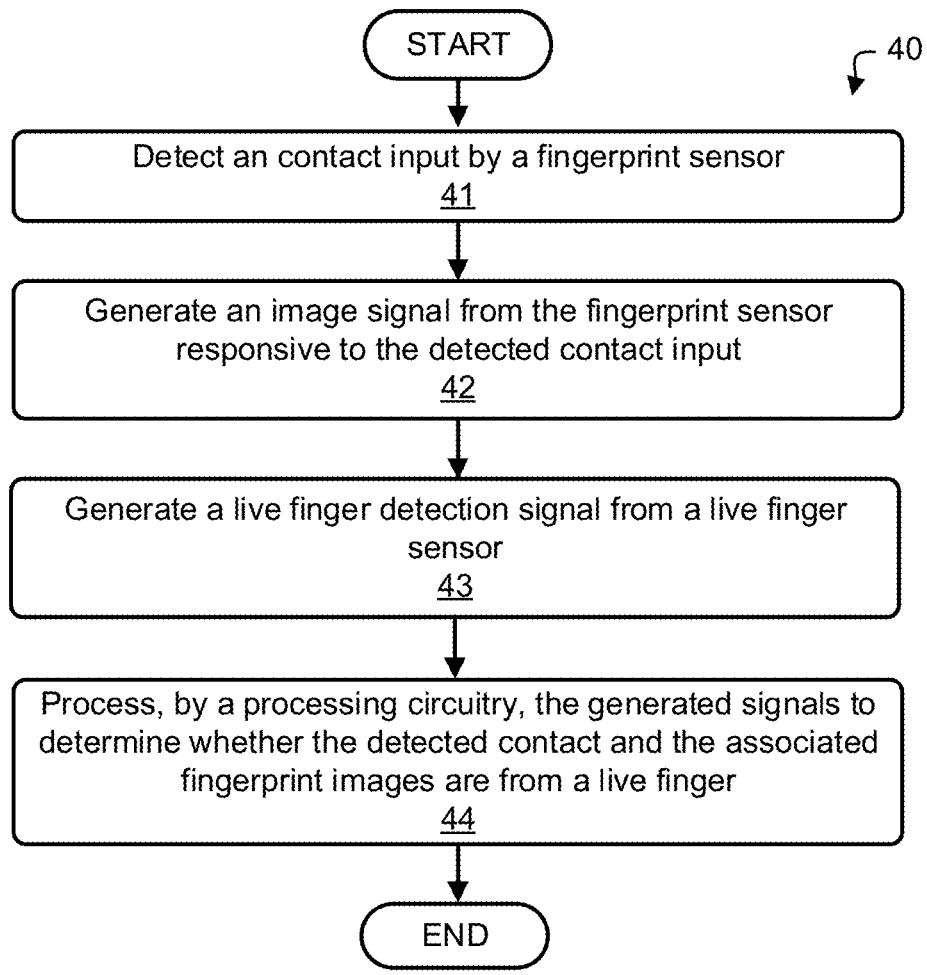
FIGS. 2A and 2B are process flow diagrams of an exemplary process for performing live finger detection by analyzing fingerprint images.
Figure 2B:
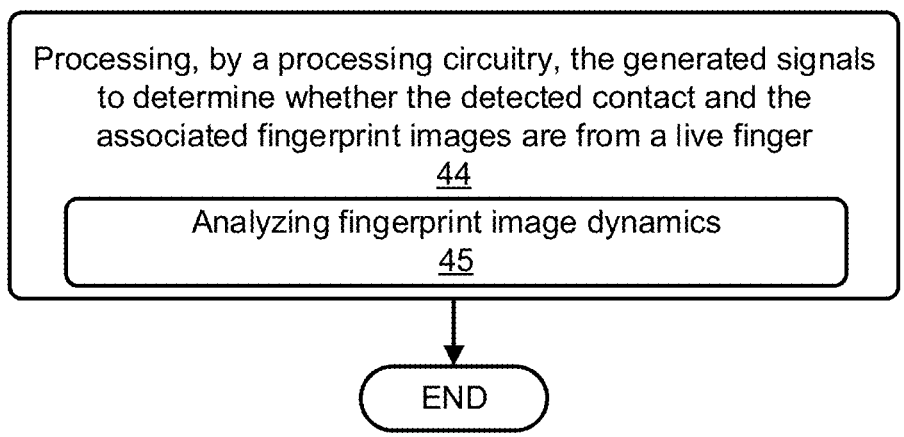

FIGS. 2A and 2B are process flow diagrams of an exemplary process 40 for performing live finger detection by analyzing fingerprint images. The process 40 includes detecting a contact input by a fingerprint sensor (41). The process includes generating an image signal from the fingerprint sensor 3 responsive to the detected contact input (42). The process includes generating a live finger detection signal from a live finger sensor (43). The generated image signal from the fingerprint sensor 3 is indicative of one or more images of a source of the detected contact. When the contact is determined to be from a finger, the output signal is indicative of one or more fingerprint images of the detected finger contact. The process includes processing, by processing circuitry, the generated image signal and the live finger detection signal to determine whether the detected contact and the associated fingerprint images are from a live finger (43). Processing the generated signals includes analyzing fingerprint image dynamics (44). The fingerprint capacitive images carry the finger movement information, so that the fingerprint image dynamics that include image details, such as signal amplitude, and bright points coordinates, can be used to determine whether the detected fingerprint by the fingerprint sensor device is from a live finger.

A sequence of fingerprint capacitive images can be captured from the generated output signal to recover the fingerprint image dynamics including the signal amplitude and bright spots distribution change over a time period. A fake finger manifests different dynamics from a live finger. For example, the fingerprint image dynamics from a live finger will include changes in the signal amplitude or the bright spots distribution over the time period that the sequence of images is captured. In contrast to the live finger, a fake, not-live finger will not show any changes or different (synthetic) changes compared to the live finger. Various implementations including hardware, software, or combination of both can be used to acquire the finger image dynamics data. A micro pressure sensor may be integrated into the finger sensor device to help capture live finger movement signals.

Figure 3A:
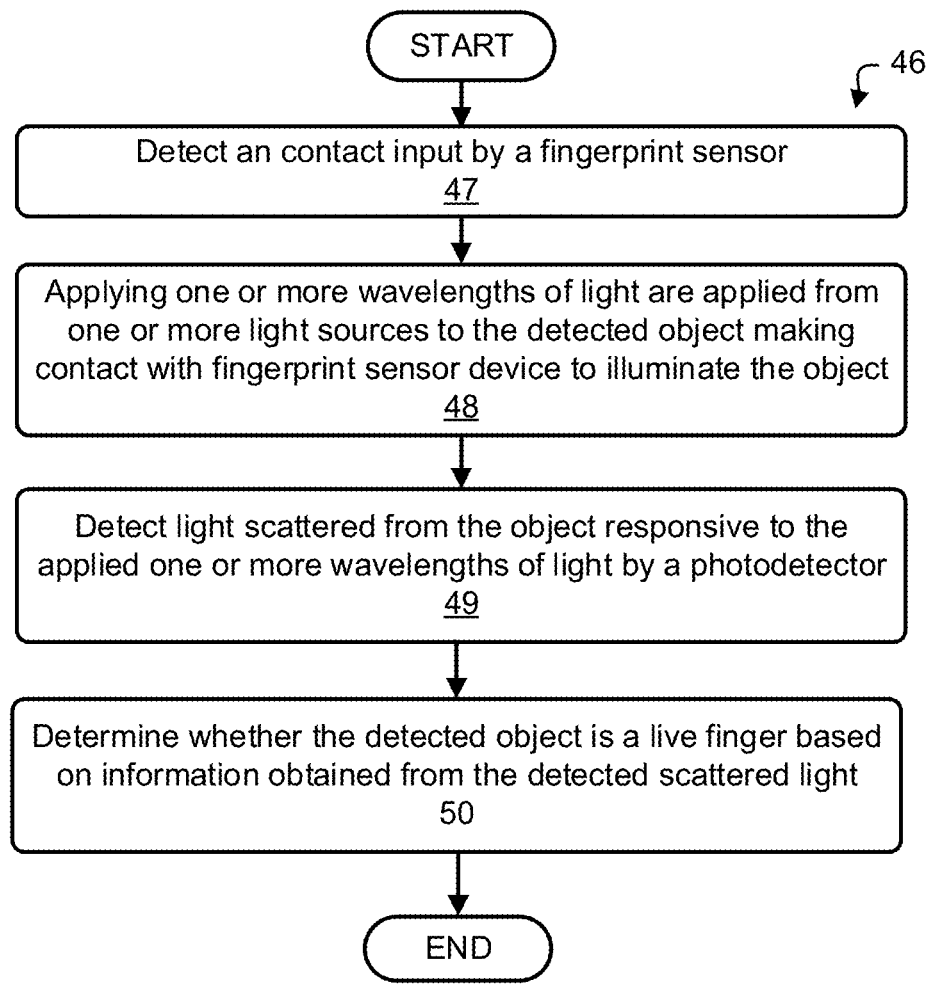
FIG. 3A is a process flow diagram of an exemplary process for performing live finger detection by analyzing a material of an object making the contact.

FIG. 3A is a process flow diagram of an exemplary process 46 for performing live finger detection by analyzing a material of an object making the contact. The process 46 uses an optical approach to analyze the material of the object causing the detected contact. The process 46 includes detecting a contact input by a fingerprint sensor (47). One or more wavelengths of light are applied from one or more light sources to the detected object making contact with fingerprint sensor device to illuminate the object (48). Light scattered from the object responsive to the applied one or more wavelengths of light are detected by a photodetector (49). The light scattered from a finger includes information on the finger material, including the blood cells, the heartbeat, the blood flow induced speckle patterns and Doppler frequency change etc. The information obtained from the scattered light is used to determine whether the detected object is a live finger (50). For example, the existence of any of the finger material information including finger material, including the blood cells, the heartbeat, the blood flow induced speckle patterns and Doppler frequency change information can be used to confirm that the detected object is a live finger.

Figure 3B:
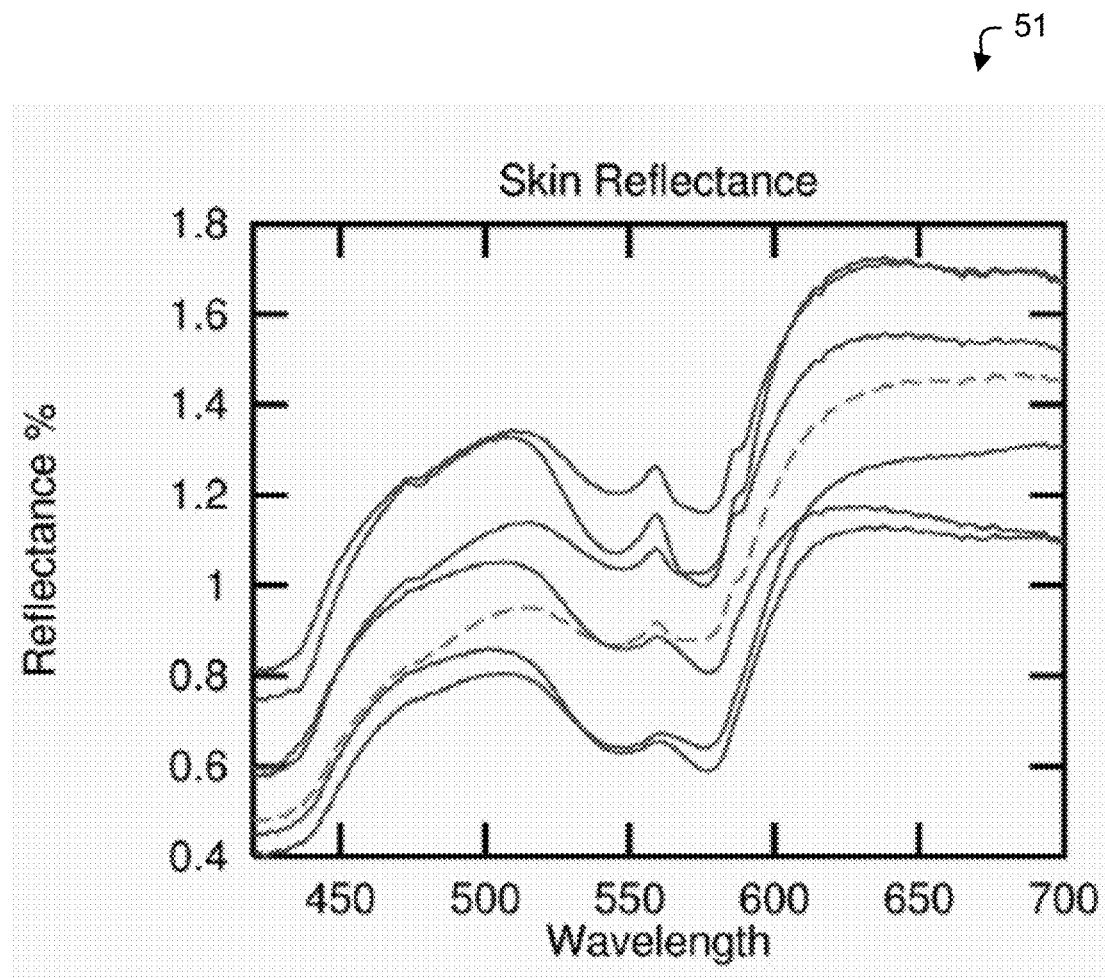
FIG. 3B is a chart showing skin reflectance with respect to different wavelengths of light.

FIG. 3B is a chart 51 showing skin reflectance with respect to different wavelengths of light. As described in the process 46 in FIG. 3A, an optical detection technique that applies lights of different wavelengths to an object (e.g., finger) can be used to determine or judge the detected object as a live finger. The optical technique is based on the human hand skin spectra responsive to different wavelengths of light. As shown in FIG. 3B, there is a 'W'-shape pattern in the human skin reflection spectra curve. The corresponding left minimum wavelength is 546.6 nm, local maximum wavelength is 559.4 nm, and right minimum wavelength is 575.5 nm. Single or multiple wavelengths of light can used to measure the heartbeat so as to judge or determine that that detected object is a live finger.

Fingerprint Sensor Device Packaging

Figure 4A:
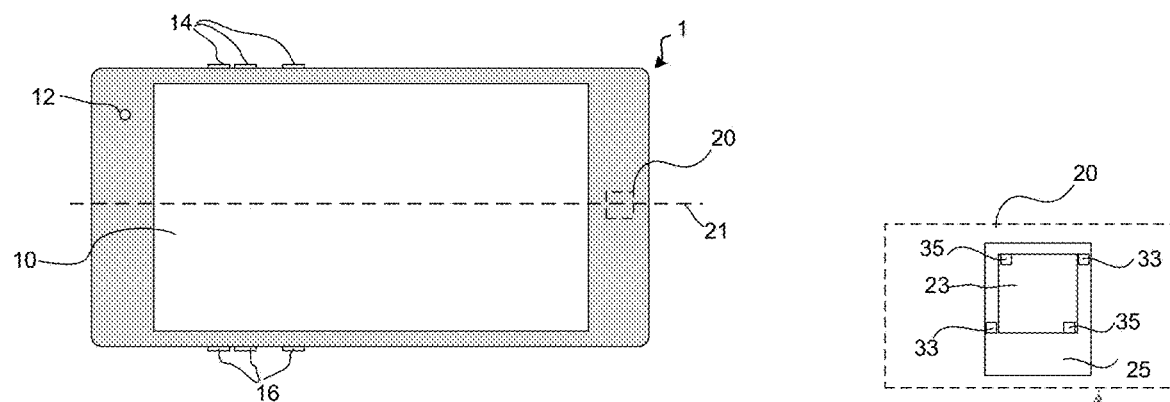
FIGS. 4A, 4B, 4C, and 4D are block diagrams of an exemplary fingerprint sensor device incorporated in a smartphone device and including a pressure sensor.
Figure 4B:
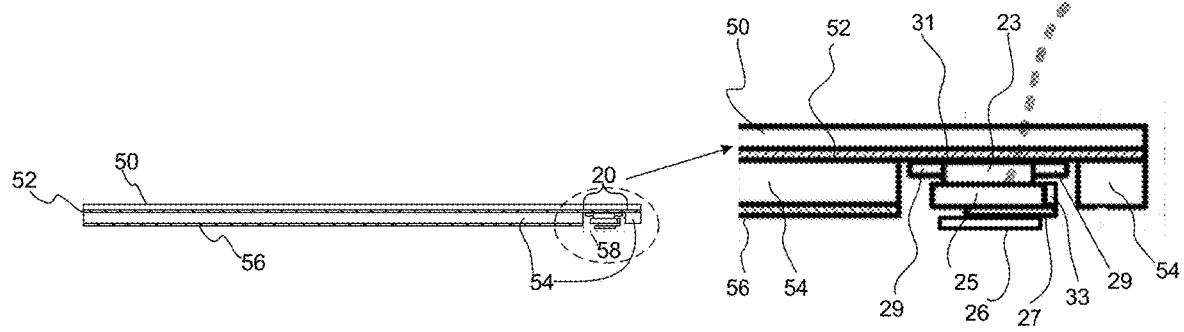
Figure 4C:
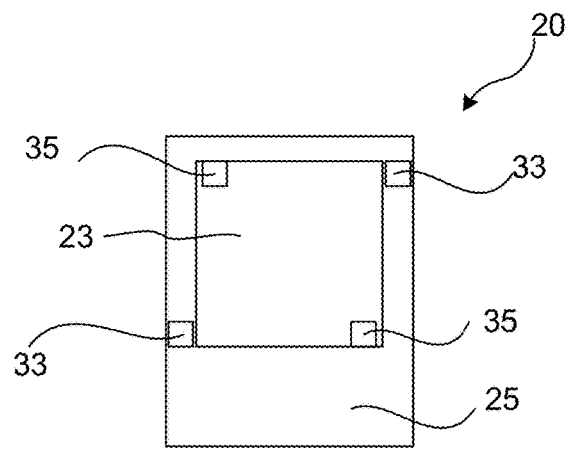
Figure 4D:
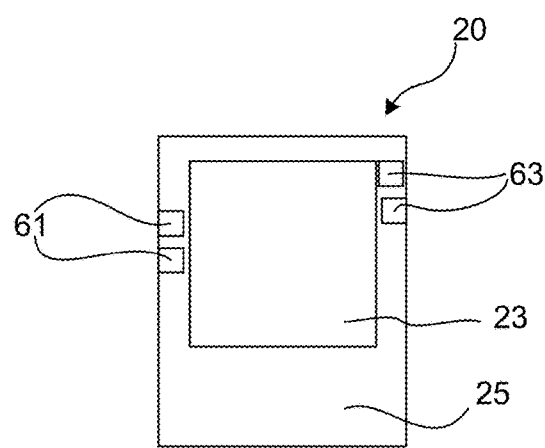

FIGS. 4A, 4B, 4C, and 4D are block diagrams of an exemplary fingerprint sensor device 20 incorporated in a smartphone device 1 and including a pressure sensor. FIG. 4B is a cross-sectional view of the smartphone platform 1 along a cut line 21. FIGS. 4C and 4D are top down views of the exemplary fingerprint sensor device 20. The smartphone device 1 includes a touch panel assembly 10 with an integrated fingerprint sensor module or device 20. The smartphone device includes other sensors 12, such as a camera. The smartphone device can also include various buttons 14 and 16, such as side buttons for receiving corresponding user inputs. The touch panel assembly 10 can include an enhanced cover glass 50 disposed over a support glass 54. A colored epoxy material layer 52 can be used to attach the cover glass 50 to the support glass 54. An ITO pattern 56 can be printed on a bottom or back surface of the support glass 54. The support glass can be disposed to form a hole 58 for housing the fingerprint sensor module or device 20.

As shown in FIG. 4B, the fingerprint sensor device 20 can include a fingerprint sensor chip 23. A back PCB with integrated circuit 25 is disposed on a bottom or back surface of the fingerprint sensor chip 23. A flexible printed circuit (FPC) 27 is disposed between the back PCB with integrated circuit 25 and a micro pressure sensor 26. An optional metal ring structure 29 can be disposed to surround the fingerprint sensor chip 23 and under the colored epoxy material layer 52. A thin epoxy material 31 can be used to glue the fingerprint sensor device 20 to the colored cover glass 50.

In applying optical sensing techniques for live finger judgment, light sensing devices, such as photodiodes and light sources, such as light emitting diodes (LEDs) and laser diodes (LDs) can be integrated into the fingerprint sensor device in different ways. FIGS. 4C and 4D are top-down views of the exemplary fingerprint sensor device 20 that illustrate two different ways of integrating the light detectors and light sources into the fingerprint sensor device. FIG. 4C shows a method of integrating the light detectors and light sources in the fingerprint sensor chip 23. The top-down views of the exemplary fingerprint sensor device 20 in FIGS. 4B and 4C show the fingerprint sensor chip 23 surrounded by discrete components, such as LEDs or LDs 33 and photodiodes 35. The light emitting diodes (LEDs) or laser diodes (LDs) 33 are disposed on the back PCB 25 and can emit light of one or more wavelengths applied to an object (e.g., a finger). The photodiodes 35 in FIG. 4C are disposed or installed with the fingerprint sensor chip 23 and can detect lights scattered from the object (e.g., a finger) responsive to the applied light.

FIG. 4D shows a method of integrating the light detectors and light sources out of the fingerprint sensor chip. The top-down view of the exemplary fingerprint sensor device 20 in FIG. 4D shows the fingerprint sensor chip 23 surrounded by discrete components, such as LEDs or LDs 63 and photodiodes 61. The light emitting diodes (LEDs) or laser diodes (LDs) 63 are disposed on the back PCB 25 and can emit light of one or more wavelengths applied to an object (e.g., a finger). The photodiodes 61 in FIG. 4D are disposed or installed off of the fingerprint sensor chip 23 and on the back PCB 25. The off-sensor chip photodiodes 61 can detect lights scattered from the object (e.g., a finger) responsive to the applied light.

Figure 5:
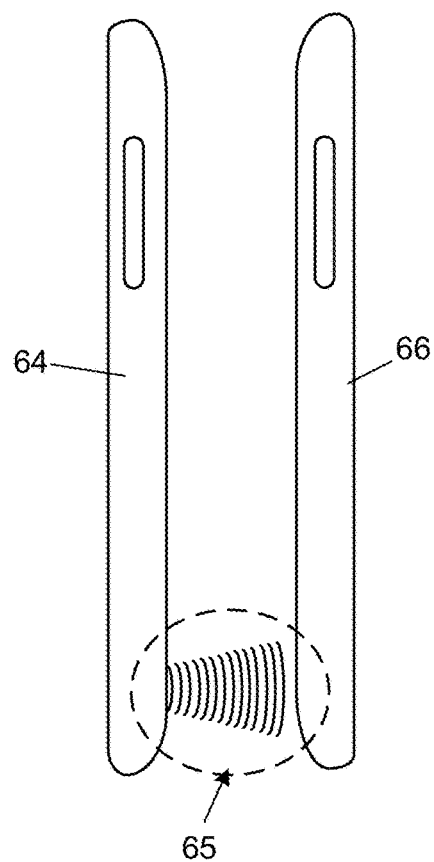
FIG. 5 is a block diagram showing an exemplary application for providing a secure communication channel.

Optical sensing techniques that incorporate the light sources and light detectors to perform live finger detection can have additional applications. FIG. 5 is a block diagram showing an exemplary application for providing a secure communication channel. Two electronic devices 64 and 66 can be in communication with each other using a high speed secure communication channel 65 provided using the light sources and photo diodes. The light source is modulated to carry the data to be transmitted, the photodiode received the data. Comparing with the near field communication (NFC) module which typical data rate is 4.24 Mbit/s, the optical communication can realize much higher data rate and the signal is harder to be captured by third device. For example, LED can realize 50 Mbit/s, Vecsel LD can realize >10 Gbit/s.

Figure 6A:
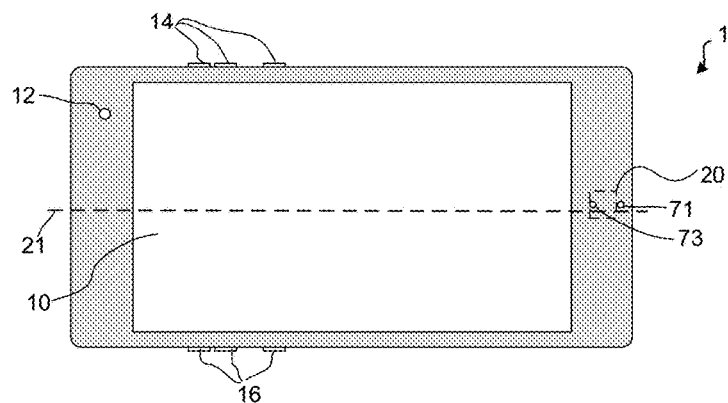
FIGS. 6A and 6B are block diagrams showing of an exemplary fingerprint sensor device incorporated in a smartphone device using an optical sensing technique for live finger judgment.
Figure 6B:
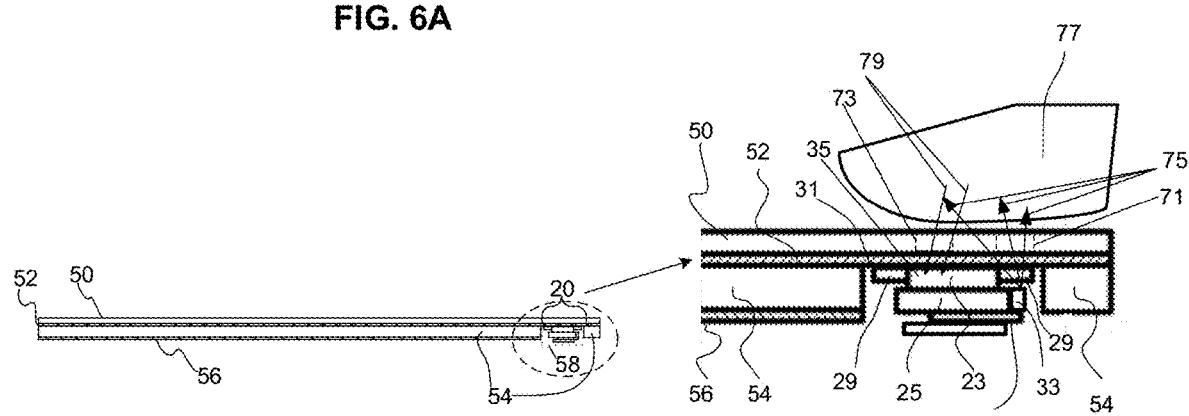

FIGS. 6A and 6B are block diagrams showing of an exemplary fingerprint sensor device 20 incorporated in a smartphone device 1 using an optical sensing technique for live finger judgment. The fingerprint sensor device 20 of FIGS. 6A and 6B is fabricated using a package under a screen cover of the smartphone device 1. FIG. 6B is a cross-sectional view of the smartphone platform 1 along a cut line 21. The smartphone device can also include various buttons 14 and 16, such as side buttons for receiving corresponding user inputs. The touch panel assembly 10 can include an enhanced cover glass 50 disposed over a support glass 54. A colored epoxy material layer 52 can be used to attach the cover glass 50 to the support glass 54. An ITO pattern 56 can be printed on a bottom or back surface of the support glass 54. The support glass can be disposed to form a hole 58 for housing the fingerprint sensor module or device 20.

As shown in FIG. 6B, the fingerprint sensor device 20 can include a fingerprint sensor chip 23. A back PCB with integrated circuit 25 is disposed on a bottom or back surface of the fingerprint sensor chip 23. A flexible printed circuit (FPC) 27 is disposed between the back PCB with integrated circuit 25 and a micro pressure sensor 26. An optional metal ring structure 29 can be disposed to surround the fingerprint sensor chip 23 and under the colored epoxy material layer 52. A thin epoxy material 31 can be used to glue the fingerprint sensor device 20 to the colored cover glass 50.

In applying optical sensing techniques for live finger judgment, light sensing devices 35, such as photodiodes and light sources 33, such as light emitting diodes (LEDs) and laser diodes (LDs) can be integrated into the fingerprint sensor device in different ways. The light detectors 35 can be integrated into the fingerprint sensor chip 23. The photodiodes 35 in FIGS. 6A and 6B are disposed or installed with the fingerprint sensor chip 23 and can detect lights scattered from the object (e.g., a finger) responsive to the applied light. The light emitting diodes (LEDs) or laser diodes (LDs) 33 are off of the fingerprint sensor chip 23 and disposed on the back PCB 25. The light sources 33 can emit light of one or more wavelengths applied to an object (e.g., a finger).

A light path window 71 for the light source 33 is disposed over the light source 33 and through the top cover glass 50. The light path window 71 is opened for the light 75 emitted by the light source 33 to come out from the light source 33. The light path window 71 can allow the light 75 emitted by the light source 33 to pass through and contact the object 77 (e.g., a finger). A light path window 73 for the light detector 35 (e.g., photodiodes) is disposed over the light detector 35 for the scattered light 79 scattered by the object 77 (e.g., finger) responsive to the emitted light 71 emitted by the light source 33 to reach the photodiodes 35. The light path windows 71 and 73 may be a clear area without any coating or a specified area with coatings that are at least partially transparent for the relevant light waves.

Figure 7A:
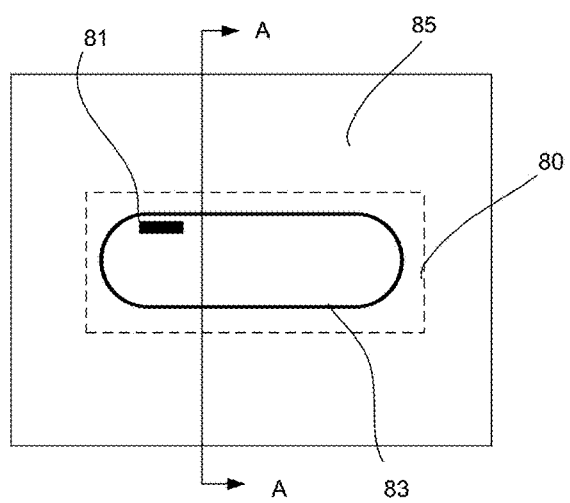
FIGS. 7A and 7B are block diagrams of an exemplary package for a fingerprint sensor device with a sandwiched cover structure.
Figure 7B:
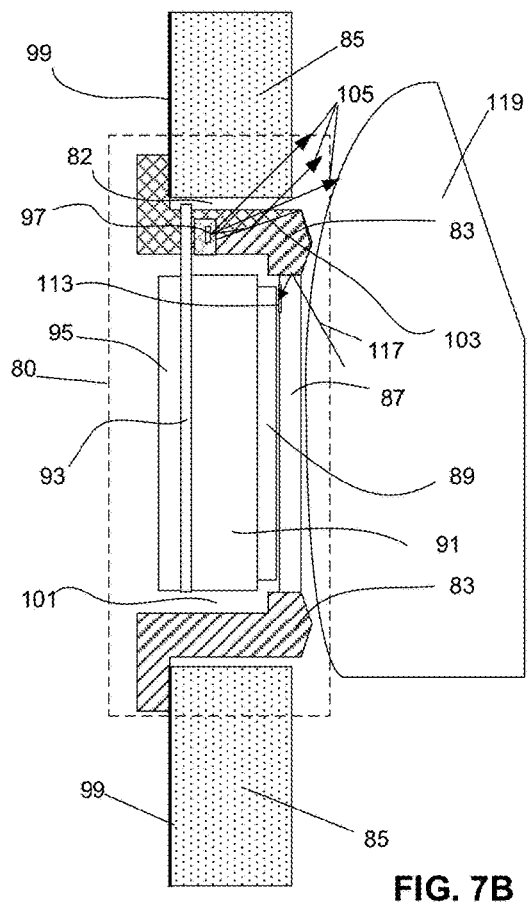

FIGS. 7A and 7B are block diagrams of an exemplary package for a fingerprint sensor device 80 with a metal ring. The fingerprint sensor device 80 is substantially similar to the fingerprint sensor device 20 of FIGS. 1 through 6B but incorporates a metal ring in the package. FIG. 7A is a top down view of the fingerprint sensor device 80 incorporated into an electronic device, such as a smartphone. FIG. 7B is a cross-sectional view cut along line A-A. A metal ring 83 is disposed to surround a fingerprint sensor chip 89. A flexible printed circuit board (FPC) 93 is disposed over a metal cover 95. A sensor trench boar 91 is created between the FPC 93 and the fingerprint sensor chip 89. An optional sensor cover 87 is disposed over the fingerprint sensor chip 89. The fingerprint sensor device 80 is embedded into a screen or top cover 85 of the electronic device using a via or hole created in the cover 85. The screen or top cover 85 of the electronic device can be disposed over a color coating 99 to provide a desired color and light path to the screen cover 85. The screen color coating 99 may be modified to form a light path according to the demand. A filling materials (such as epoxy) 101 can be applied hold the sensor device 80 in place.

A light source (LED, LD, etc.) 97 is disposed on the FPC 93 as shown in FIG. 7B. A gap 82 between the metal ring 83 and the screen cover 85 is used as the light path for the light beams 105 emitted by the light source 97. The gap 82 functioning as the light path can be enhanced by a tilted outer wall surface 103 of the metal ring at the gap 82. A light path window 81 for a light detector 113 (e.g., a photodiode) is disposed over the light detector 113 (e.g., a photodiode) to allow scattered light 117 that is scattered by the object 119 (e.g., a finger) responsive to the light beams 105 emitted by the light source 97 to reach the light detector 113 (e.g., a photodiode). The light path window 81 for the photodiode 113 may be of clear or with transparent coatings to allow the scattered light to at least partially path through the window 81.

Figure 8A:
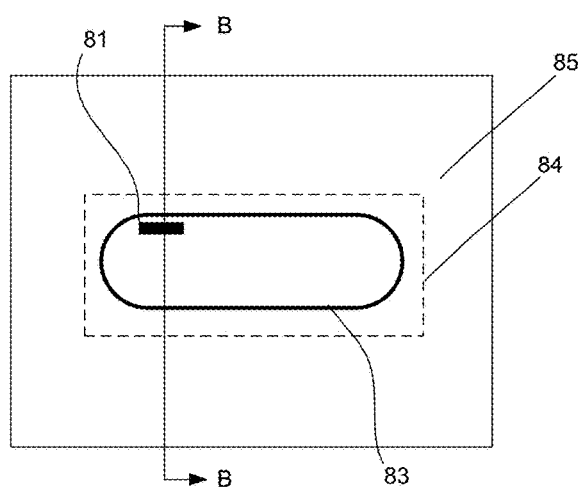
FIGS. 8A and 8B are block diagrams of an exemplary package for a fingerprint sensor device with a metal ring.
Figure 8B:
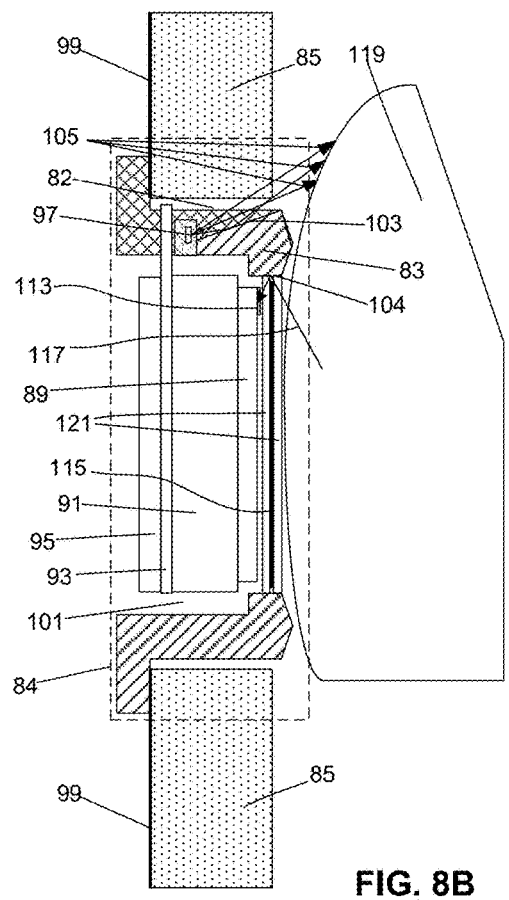

FIGS. 8A and 8B are block diagrams of an exemplary package for a fingerprint sensor device 84 with a sandwiched sensor cover. The fingerprint sensor device 84 is substantially similar to the fingerprint sensor device 20 of FIGS. 1 through 6B and fingerprint sensor device 80 of FIGS. 7A and 7B but incorporates a metal ring in the package with a sandwiched sensor cover. FIG. 8A is a top down view of the fingerprint sensor device 84 incorporated into an electronic device, such as a smartphone. FIG. 8B is a cross-sectional view cut along line B-B. A metal ring 83 is disposed to surround a fingerprint sensor chip 89. A flexible printed circuit board (FPC) 93 is disposed over a metal cover 95. A sensor trench boar 91 is created between the FPC 93 and the fingerprint sensor chip 89. An optional sensor cover 121 is disposed over the fingerprint sensor chip 89. The sensor cover 121 is disposed as a sandwiched structure of two layers with a color layer 115 in between the two layers 121. The sensor cover's 121 color layer 115 can be used to attenuate target light. The fingerprint sensor device 84 is embedded into a screen or top cover 85 of the electronic device using a via or hole created in the cover 85. The screen or top cover 85 of the electronic device can be disposed over a color coating 99 to provide a desired color and light path to the screen cover 85. The screen color coating 99 may be modified to form a light path according to the demand. A filling materials (such as epoxy) 101 can be applied hold the sensor device 84 in place.

A light source (LED, LD, etc.) 97 is disposed on the FPC 93 as shown in FIG. 7B. A gap 82 between the metal ring 83 and the screen cover 85 is used as the light path for the light beams 105 emitted by the light source 97. The gap 82 functioning as the light path can be enhanced by a tilted outer wall surface 103 of the metal ring at the gap 82. A light path window 81 for a light detector 113 (e.g., a photodiode) is disposed over the light detector 113 (e.g., a photodiode) to allow scattered light 117 that is scattered by the object 119 (e.g., a finger) responsive to the light beams 105 emitted by the light source 97 to reach the light detector 113 (e.g., a photodiode). The light path window 81 for the photodiode may be of clear or with transparent coatings to allow the scattered light to at least partially path through the window 81.

The sandwiched structure of the sensor cover 121 with the color layer 115 can help to make the light path window 81 not visible through the cover. In the sandwich-structured cover 121, the color layer or layers 115 are placed between two transparent layers (such as glass). The transparent layers can be glued onto the sensor chip 89 to provide the light path from the finger 119 to the photodiode(s) 113. In some implementations, the color layer(s) 115 can be modified at the edge area. Also, an inner wall 104 of the metal ring 83 can reflect the finger scattered light 117 to the photodiodes 113.

Figure 9A:
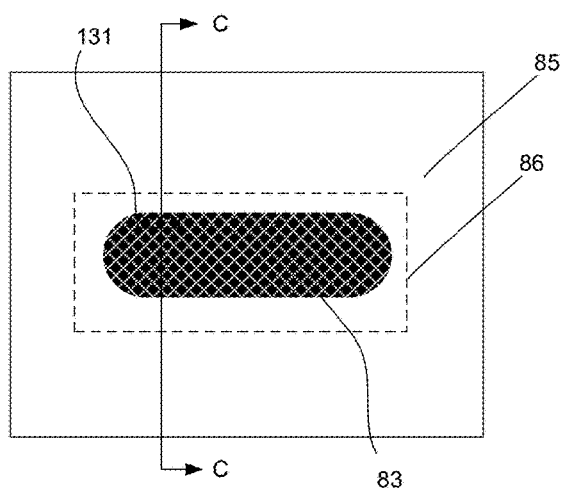
FIGS. 9A and 9B are block diagrams of an exemplary package for a fingerprint sensor device with a metal ring with a mesh-colored cover.
Figure 9B:
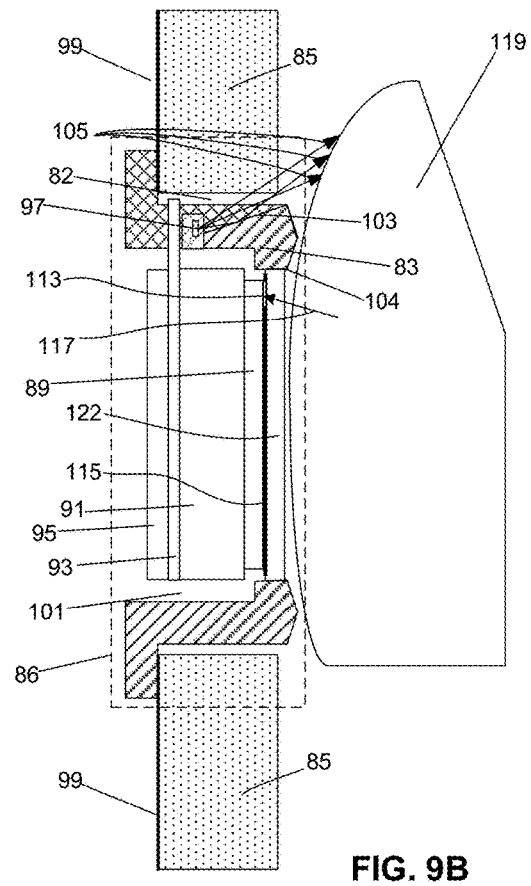

FIGS. 9A and 9B are block diagrams of an exemplary package for a fingerprint sensor device 86 with a metal ring with a mesh-colored cover. The fingerprint sensor device 86 is substantially similar to the fingerprint sensor device 20 of FIGS. 1 through 6B, fingerprint sensor device 80 of FIGS. 7A and 7B, and fingerprint sensor device 84 of FIGS. 8A and 8B but incorporates a metal ring in the package with a mesh-colored cover. FIG. 9A is a top down view of the fingerprint sensor device 86 incorporated into an electronic device, such as a smartphone. FIG. 9B is a cross-sectional view cut along line C-C. A metal ring 83 is disposed to surround a fingerprint sensor chip 89. A flexible printed circuit board (FPC) 93 is disposed over a metal cover 95. A sensor trench boar 91 is created between the FPC 93 and the fingerprint sensor chip 89. An optional sensor cover 121 is disposed over the fingerprint sensor chip 89. The sensor cover 122 is disposed as a mesh cover with a color layer 115 in between the cover 122 and the fingerprint sensor chip 89. The mesh cover's 122 color layer 115 can be used to attenuate target light. The fingerprint sensor device 84 is embedded into a screen or top cover 85 of the electronic device using a via or hole created in the cover 85. The screen or top cover 85 of the electronic device can be disposed over a color coating 99 to provide a desired color and light path to the screen cover 85. The screen color coating 99 may be modified to form a light path according to the demand. A filling materials (such as epoxy) 101 can be applied hold the sensor device 86 in place.

A light source (LED, LD, etc.) 97 is disposed on the FPC 93 as shown in FIG. 7B. A gap 82 between the metal ring 83 and the screen cover 85 is used as the light path for the light beams 105 emitted by the light source 97. The gap 82 functioning as the light path can be enhanced by a tilted outer wall surface 103 of the metal ring at the gap 82. A light path window for a light detector 113 (e.g., a photodiode) is not used due to the mesh cover 122 that allows scattered light 117 that is scattered by the object 119 (e.g., a finger) responsive to the light beams 105 emitted by the light source 97 to reach the light detector 113 (e.g., a photodiode) through the mesh cover 122. The mesh cover 122 is structured as a mesh to allow the scattered light 117 to at least partially path through the mesh cover 122. For example, the mesh colored cover 122 and the color layer 115 are made with mesh structures that leaves gaps as a light path for the scattered light 117 to travel from the finger 119 to the photodiodes 113. The mesh color structure 122 can occupy the whole cover area or cover only the local area above the photodiode 113. Also, an inner wall 104 of the metal ring 83 can reflect the finger scattered light 117 to the photodiodes 113.

Fingerprint Sensor Technologies

Fingerprint sensor devices 20, 80, 84 and 86 as disclosed in this patent document can be implemented using one or a combination of various sensing technologies including self-capacitive sensing, mutual capacitive sensing, and optical sensing among others. The disclosed technology for detecting a live finger is not dependent on a particular type of sensing technology, and any one or a combination of the various sensing technologies can be incorporated.

Figure 10A:
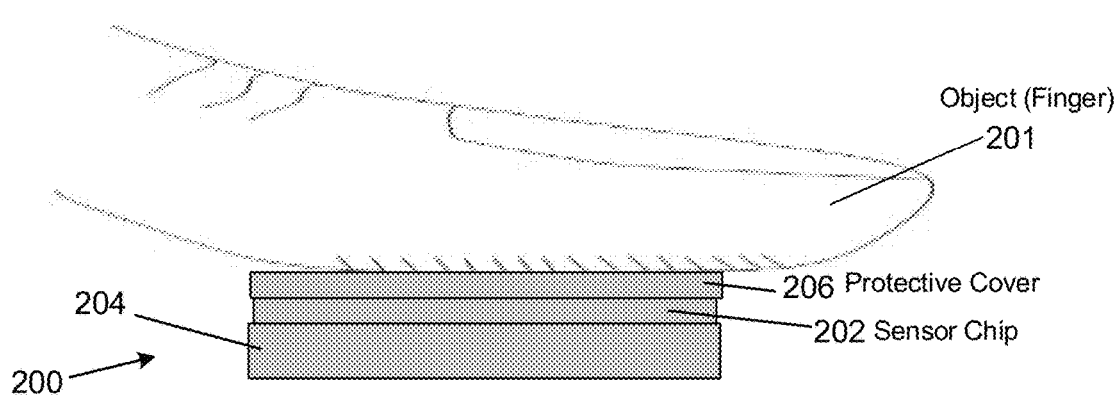
FIG. 10A is a block diagram of an exemplary fingerprint sensor device implementing self-capacitive sensing with active sensor pixel and amplification.

For example, FIG. 10A is a block diagram of an exemplary fingerprint sensor device 200 implementing self-capacitive sensing with active sensor pixel and amplification. The fingerprint sensor device 200 is one example of the fingerprint sensor device 20, 80, 84 and 86 of FIGS. 1 through 9B that implements self-capacitive sensing. The self-capacitive fingerprint sensor device 200 includes a sensor chip 202 disposed over a substrate carrier 204 and a protective film or cover layer 206 disposed over the sensor chip 202. The protective film or cover layer 106 can include an insulator or dielectric material such as glass, silicon dioxide ($SiO_2$), sapphire, plastic, polymer, other substantially similar materials. The protective film or cover layer 106 can be present to protect the sensor chip 202 and to function as a part of a dielectric layer between a surface of a finger 201 and conductive sensing electrodes of individual sensor pixels in the sensor chip 202. The protective film or cover layer 206 is an optional layer depending on the application of the fingerprint sensor device 200. In some implementations, the fingerprint sensor device 200 can be disposed through an opening of a top cover glass of an electronic device such as a mobile phone or under a top cover glass of the electronic device. When used in the under-the-glass application, the protective film or cover 206 is not needed because the top cover glass of the electronic device will function to protect the sensor chip 202 and act as the dielectric layer. The sensor chip 202 includes an array of sensor pixels that in combination senses or captures fingerprint data from the finger 201 in contact with the protective film or cover layer 206. Each sensor pixel of the sensor chip 202 generates an output signal (e.g., a voltage) based on a capacitance of a capacitor associated with a ridge or valley of the finger 201. The output signals when combined represent a fingerprint image of the finger 201. Higher the number of pixel sensors, greater the resolution of the fingerprint image.

Figure 10B:
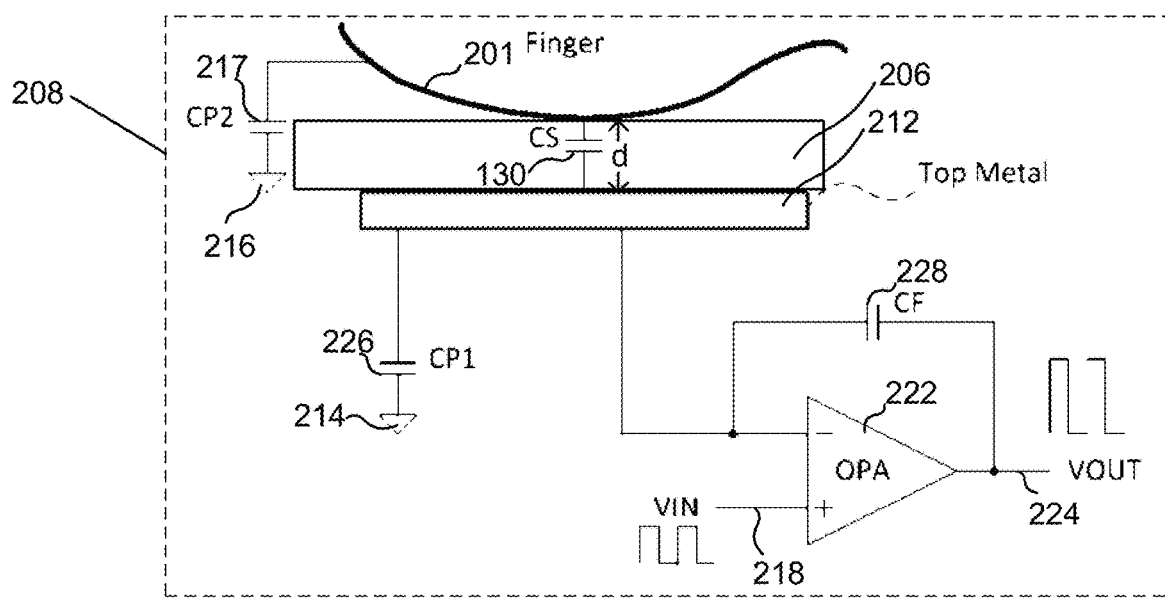
FIG. 10B is a block diagram of an exemplary sensor pixel.
Figure 10C:
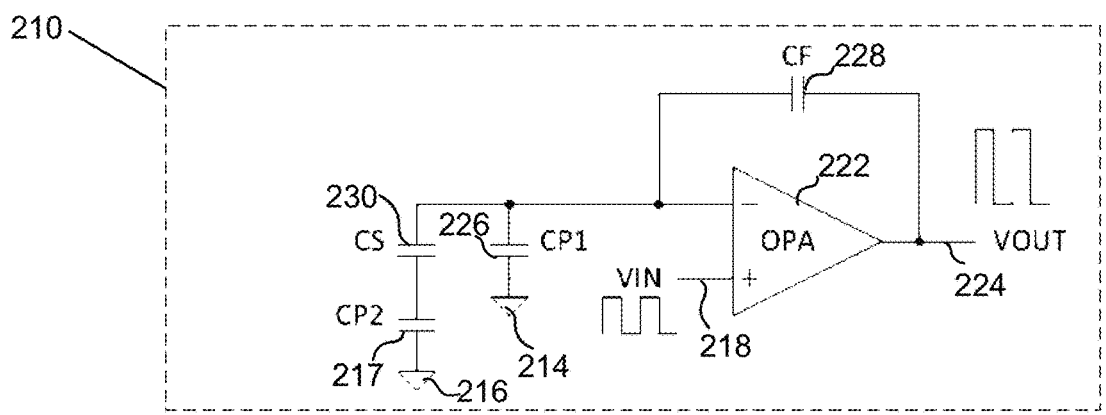
FIG. 10C is a circuit equivalent of the exemplary sensor pixel shown in FIG. 10B.

An exemplary sensor pixel 208 is shown in FIG. 10B. Each sensor pixel in the array of sensor pixels of the sensor chip 202 can be substantially similar to the exemplary sensor pixel 208. The exemplary sensor pixel 108 includes an operational amplifier 222 to amplify a capacitance related signal (e.g., voltage signal) detected by the exemplary sensor pixel 208. A sensor electrode 212 that includes a conductive material, such as one of a variety of metals is electrically connected to a negative or inverting terminal of the amplifier 222. The amplifier configuration shown and described with respect to FIG. 10B (and other figures of this patent document) is just one example and other amplifier configurations are possible including a positive feedback configuration. The sensor electrode 212 and a local surface of the finger 201 function as opposing plates of a capacitor CS 230. The capacitance of the capacitor CS 230 varies based on a distance between the local surface of the finger 201 and the sensor electrode 212, the distance between the two plates of the capacitor CS 230. The capacitance is inversely proportional to the distance between the two plates of the capacitor CS 230. The capacitance is larger when the sensor electrode 212 is opposite a ridge of the finger 201 than when opposite a valley of the finger 201.

In addition, various parasitic capacitors can be formed between different conductive elements in the exemplary sensor pixel 208. For example, a parasitic capacitor CP1 226 can form between the sensor electrode 212 and a device ground terminal 214. Another parasitic capacitor CP2 217 can form between the local surface of the finger 201 and an earth ground 216. Device ground is coupled to earth ground closely. Yet another capacitor CF 128 can form between an output conductor of the amplifier 222 and the negative or inverting terminal of the amplifier 222 and functions as a feedback capacitor to the amplifier 222.

The positive terminal of the amplifier 222 is electrically connected to an excitation signal Vin 218. The excitation signal Vin 218 can be directly provided to the positive terminal of a dedicated amplifier in each sensor pixel. By providing the excitation signal Vin 218 directly to the positive terminal of the amplifier 222, the exemplary sensor pixel 208 becomes an active sensor pixel. In addition, providing the excitation signal Vin 218 directly to the positive terminal of the amplifier 222 eliminates the need to include an excitation electrode, common to all sensor pixels, which reduces a conductive (e.g., metal) layer from the semiconductor structure of the sensor chip 202. In addition, by providing the excitation signal Vin 218 directly to the amplifier 222, the excitation signal Vin 218 is not applied directly to the finger to avoid potentially irritating or injuring the finger 201. Moreover, because the excitation electrode for applying the excitation signal directly to the finger is not used, all components of the fingerprint sensor device 200 can be integrated into a single packaged device, and the entire fingerprint sensor device 200 can be disposed under the protective cover glass. With the entire fingerprint sensor device 200 disposed under the protective cover glass, the fingerprint sensor device 200 is protected from the finger and other external elements that can potentially damage the fingerprint sensor.

The amplifier 222 can generate an output signal based at least on the variable capacitance of the variable capacitor CS 230, and the output signal can contributes to the overall fingerprint data. The amplifier 222 can generate the output signal based at least on the variable capacitance and feedback capacitance of the feedback capacitor CF with no additional non-parasitic capacitances contributing to the output signal. This is partly because, as described above, an additional electrode such as an external drive electrode is not uses in the sensor pixel 208.

FIG. 1C is a circuit equivalent 210 of the exemplary sensor pixel 208 shown in FIG. 10B. The operational amplifier 222 has the negative or inverting terminal electrically connected to capacitor CS 230, which is in series with the parasitic capacitor CP2 217. The negative or inverting terminal of the amplifier 222 is also electrically connected to the parasitic capacitor CP1 226, which is in parallel with the series combination of capacitors CS 230 and CP2 217. The negative or inverting terminal of the amplifier 222 is also electrically connected to the feedback capacitor CF 228. The excitation signal Vin 218 is directly applied to the positive or non-inverting terminal of the amplifier 222.

The output signal 224 of the amplifier 222 is the amplified voltage of the signal detected by the exemplary pixel sensor 208. The following equation 1 shows the transfer function of the amplifier output 224 shown in FIG. 10C.

$$VOUT = VIN \cdot \left[1 + \frac{CP1}{CF} + \frac{CS \cdot CP2}{CF(CS + CP2)}\right] \quad \text{(Equation 1)}$$

Because normally, CP2>100×CS, equation 1 can be simplified as following equation 2:

$$VOUT = VIN \cdot \left[1 + \frac{CP1}{CF} + \frac{CS}{CF}\right] \quad \text{(Equation 2)}$$

Because the fingerprint data is reflected in changes to the capacitance of CS 230, the changes to the capacitance and the fingerprint data are likewise reflected in the output signal Vout 224.

Fingerprint Sensor Technologies: Optical Sensors Integrated with Pixels

Figure 11A:
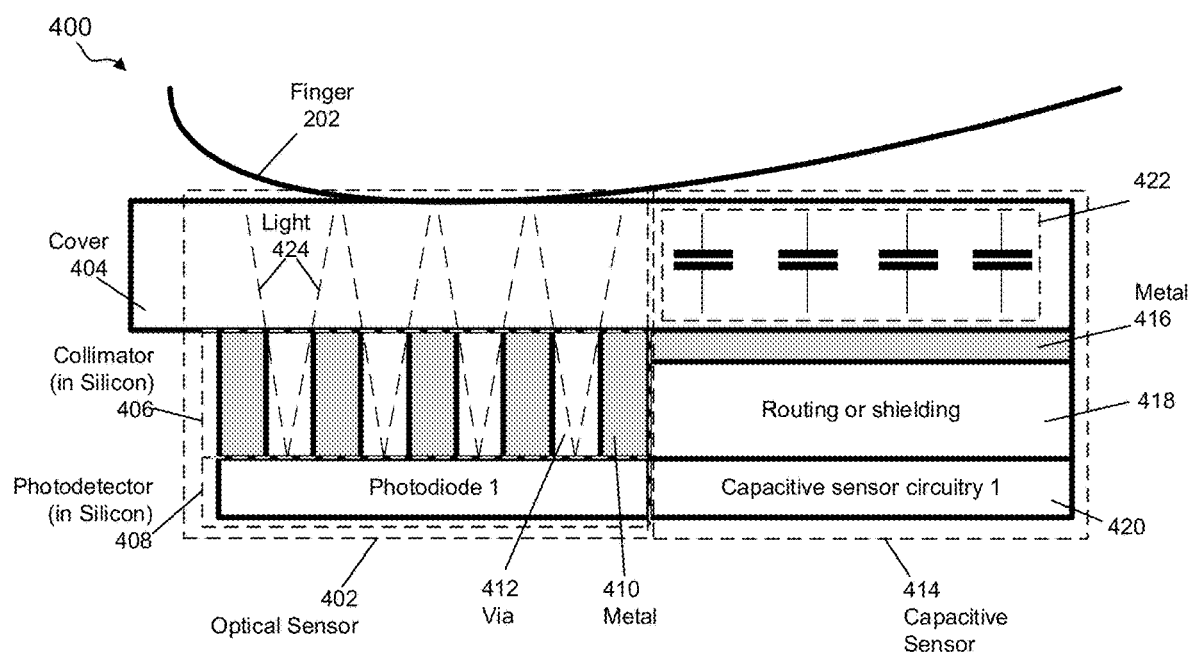
FIG. 11A shows an exemplary fingerprint sensor device implemented to incorporate a capacitive sensor in addition to an optical sensor for each sensor pixel.
Figure 11B:
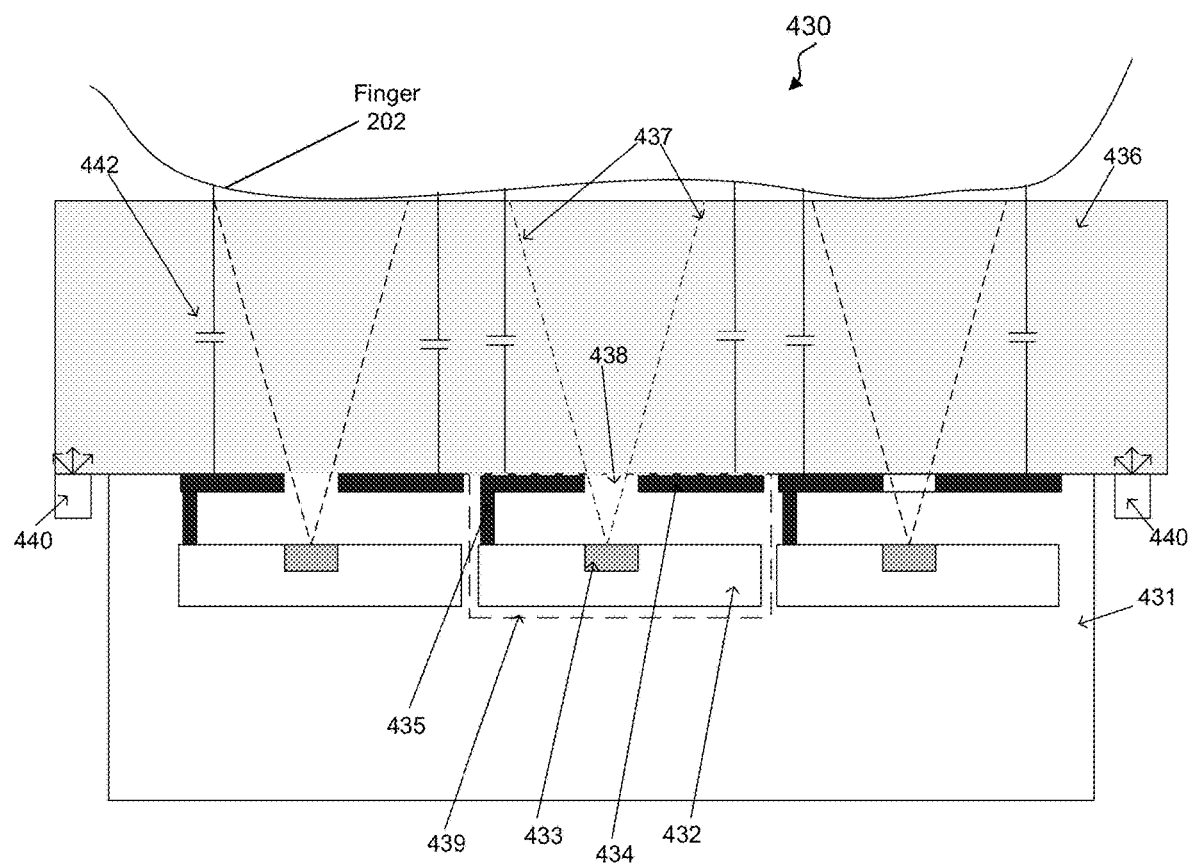
FIG. 11B illustrates an exemplary fingerprint sensor device that structurally integrates an optical sensor with a capacitive sensor in each sensor pixel in an array of sensor pixels.

In another aspect of the disclosed technology, each sensing pixel of a fingerprint sensor device can be a hybrid sensing pixel having a capacitive sensor for capturing fingerprint information and an optical sensor for capturing fingerprint information including live finger detection as disclosed in this patent document. FIGS. 11A and 11B show two examples of hybrid sensing pixel designs.

FIG. 11A shows an example of a fingerprint sensor device 400 that incorporates a capacitive sensor in addition to an optical sensor for each sensor pixel in capturing fingerprint information. By combining both capacitive sensors and optical sensors, fingerprint images obtained with the optical sensors can be used to better resolve the 3D fingerprint structure obtained with the capacitive sensors. For illustrative purposes, the structure shown in FIG. 11A represents one sensor pixel in an array of sensor pixels and each sensor pixel includes an optical sensor 402 and a capacitive sensor 414 that are disposed next to each other within the same pixel.

The optical sensor 402 includes a photodetector 408 and a collimator 406 disposed over the photodetector 408 to narrow or focus reflected light 424 from finger 202 toward the photodetector 408. One or more light sources, such as LEDs (not shown) can be disposed around the collimator 406 to emit light, which is reflected off the finger as reflected light 424 and is directed or focused toward the corresponding photodetector 408 to capture a part of the fingerprint image of the finger 202. The collimator 406 can be implemented using an optical fiber bundle or one or more metal layer(s) with holes or openings. FIG. 11A shows the collimator 406 implemented using one or more metal layers 410 with holes or openings 412.

In the capacitive sensing part of each sensing pixel, the capacitive sensor 414 includes a capacitive sensor plate 416 that is electromagnetically coupled to a portion of a finger that is either nearby or in contact with the sensing pixel to perform the capacitive sensing. More specifically, the capacitive sensor plate 416 and the finger 202 interact as two plates of one or more capacitive elements 422 when the finger 202 is in contact with or substantially near the optional cover 404 or a cover on a mobile device that implements the fingerprint sensor device 400. The number of capacitive sensor plates 416 can vary based on the design of the capacitive sensor 414. The capacitive sensor plate 416 can be implemented using one or more metal layers. The capacitive sensor plate 416 is communicatively coupled to capacitive sensor circuitry 420 so that the capacitive sensor circuitry 420 can process the signals from the capacitive sensor plate 416 to obtain data representing the 3D fingerprint structure. A routing or shielding material can be disposed between the capacitive sensor plate 416 and the capacitive sensor circuitry to electrically shield the metal plate 416. The capacitive sensor circuitry 420 can be communicatively coupled to both the capacitive sensor plate 416 and the photodetector 408 to process both the signal from the capacitive sensor plate 416 and the signal from the photodetector 408.

In FIG. 11A, the capacitive sensor and the optical sensor within each hybrid sensing pixel are adjacent to and displaced from each other without being spatially overlapped. FIG. 11B illustrates another example of a fingerprint sensor device 430 that structurally integrates an optical sensor and a capacitive sensor in each hybrid sensor pixel in a spatially overlap configuration in an array of sensor pixels to reduce the footprint of each hybrid sensing pixel. The fingerprint sensor device 430 includes a semiconductor substrate 431, such as silicon. Over the substrate 431, multiple sensing elements or sensing pixels 439 are disposed. Each sensing element or sensing pixel 439 includes active electronics circuitry area 432 including CMOS switches, amplifier, resistors and capacitors for processing sensor signals. Each sensing pixel or sensing element 439 includes a photodetector 433 disposed or embedded in the active electronics circuitry area 432. A capacitive sensor plate or a top electrode 434 of the capacitive sensor for capacitive sensing is disposed over a photodetector 433 and includes a hole or opening 438 on the sensor plate 434 to function also as a collimator of light for directing light onto the photodetector 433. A via 435 filled with conductive material is disposed to electrically connect the top electrode 434 to the active circuit elements 432. By adjusting the opening or the hole and the distance of the top electrode 434 with the photodetector 433, the light collecting angle 437 of the photodetector (e.g., photodiode) 433 can be adjusted. The fingerprint sensor device 430 is covered by a protective cover 436, which includes hard materials, such as sapphire, glass etc. Photodetector 433 light collection angle 437 can be designed to preserve the spatial resolution of the image collected by the photodiode arrays. A light source 440, such as an LED, is placed under the cover, on the side of fingerprint sensor device 430 to emit light, which is reflected off the finger and directed toward the photodetector 433 to capture the fingerprint image. When a finger touches or comes substantially near the protective cover, the finger and the sensing top electrode 434 in combination form a capacitive coupling (e.g., capacitor 442) between the human body and sensing top electrode 434. The fingerprint sensor device 430 that includes both optical and capacitive sensors can acquire images of both a light reflection image of fingerprint and also a capacitive coupling image. The sensing top electrode 434 serves dual purpose: 1) for capacitive sensing, and 2) as a collimator (by fabricating one or more holes on the sensing top electrode 434) to direct, narrow or focus reflected light from the finger toward the photodetector 433. Reusing the sensing top electrode 434 eliminates the need for additional metal layer or optical fiber bundle, and thus reduces each pixel size and accordingly the overall size of the fingerprint sensor device 430.

Figure 12:
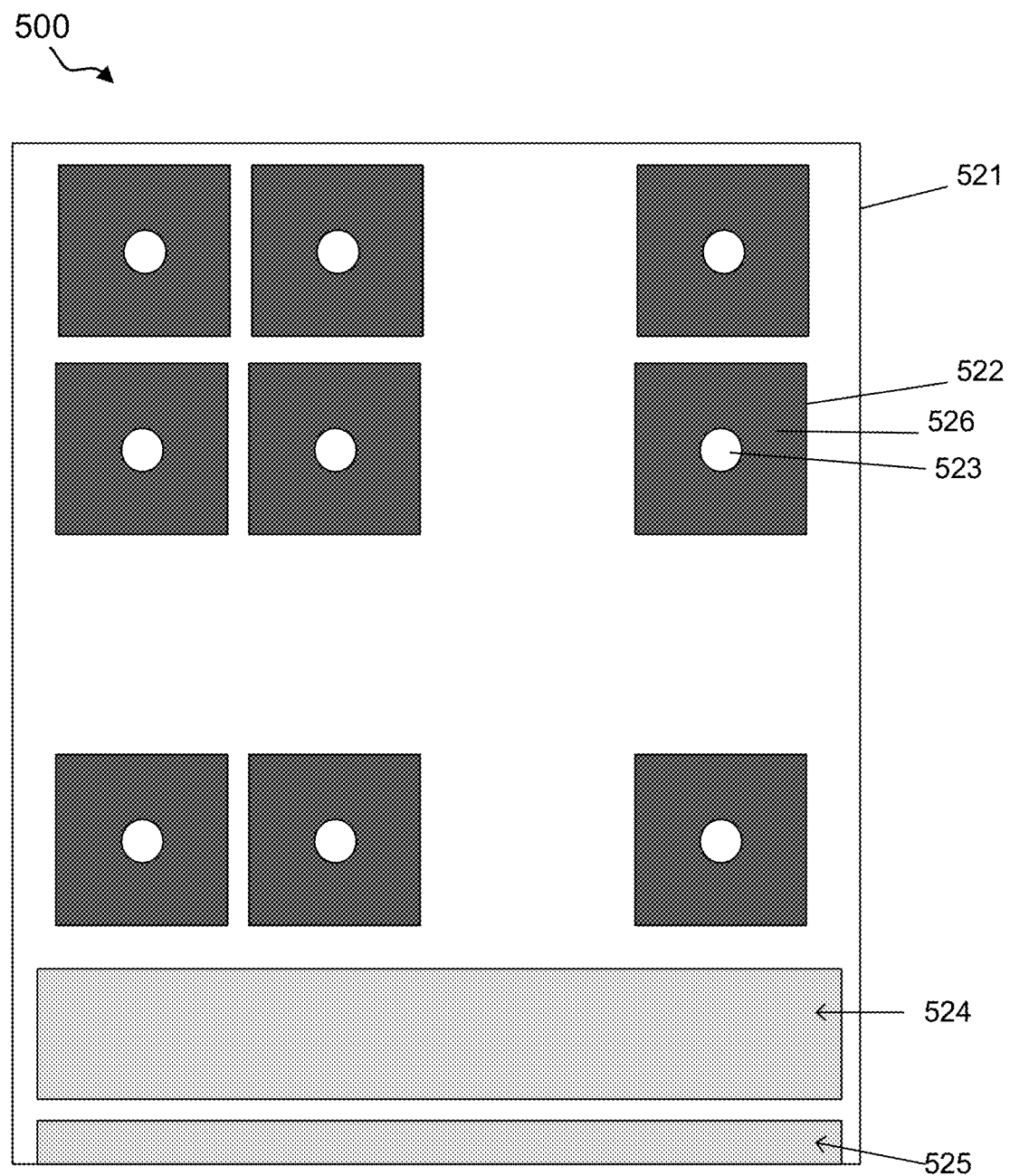
FIG. 12 is a top-down view of an exemplary hybrid fingerprint sensor device incorporating both an optical sensor and a capacitive sensor.

FIG. 12 is a top-down view of an exemplary hybrid fingerprint sensor device 500 incorporating both an optical sensor and a capacitive sensor in each hybrid sensing pixel. The fingerprint sensor device 500 is implemented as a CMOS silicon chip 521 that includes an array of hybrid (incorporating both an optical sensor and a capacitive sensor) sensing elements or pixels 522. The size or dimension of the sensing elements can be in the range of 25 µm to 250*m*, for example. The hybrid sensor device 500 can include an array of support circuitry including amplifiers, ADCs, and buffer memory in a side region 524. In addition, the hybrid sensor device 500 can include an area for wire bonding or bump bonding 525. A top layer 526 of the hybrid sensor element 522 can include a metal electrode for capacitive sensing. One or more openings or holes 523 can be fabricated on each top metal electrode 23 to structurally serve as a collimator for directing light in a vertical direction to shine on a photodetector under the top electrode. Thus, the top layer 526 structure can serve dual purposes of optical and capacitive sensing. A sensor device processor can be provided to process the pixel output signals from hybrid sensing pixels to extract the fingerprint information.

In addition to sharing the same structure for capacitive sensing and for focusing light in the vertical direction as a collimator, one instance of sensor signal detection circuitry can be shared between the optical and capacitive sensors to detect the sensor signals from both a photodetector and a capacitive sensor plate.

Figure 13A:
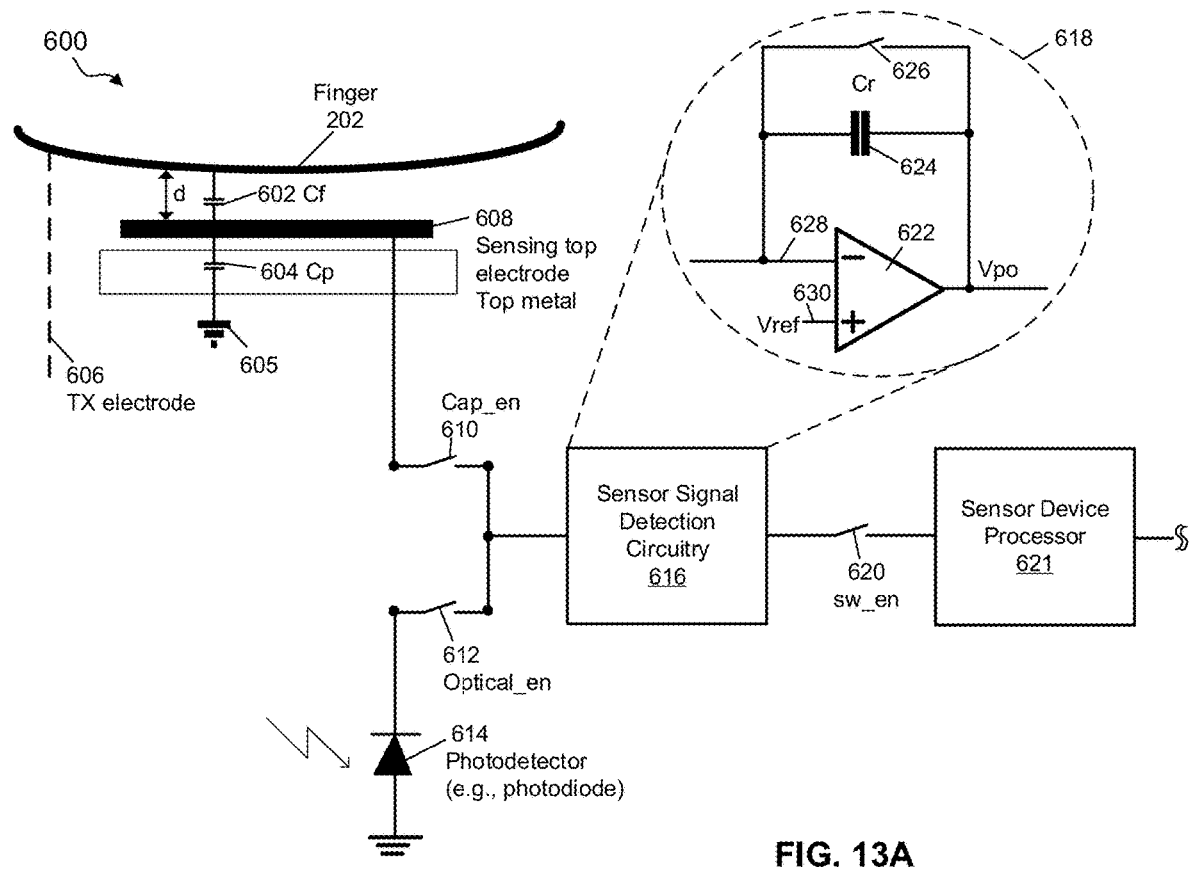
FIG. 13A illustrates a circuit diagram for an exemplary hybrid fingerprint sensing element or pixel.

FIG. 13A illustrates a circuit diagram for an exemplary hybrid fingerprint sensing element or pixel 600 having both capacitive sensing and optical sensing functions for fingerprints. The exemplary sensor pixel 600 includes sensor signal detection circuitry 616 to selectively switch between detecting or acquiring sensor signals from a sensing top electrode (e.g., a top metal layer) 608 based on capacitive sensing and a photodetector (e.g., a photodiode) 614 based on optical sensing to acquire both a reflective optical image from the photodetector 614 and a capacitive coupled image from the capacitive sensor electrode 608 from a finger. In some implementations, such as the one specifically illustrated in FIG. 13A, the two images from the two sensing mechanisms in each hybrid sensing pixel can be serially processed by the sensor signal detection circuitry 611. In the illustrated example, switches 610 and 612 have first terminals that are electrically coupled to the sensing top electrode 608 and the photodetector 614, respectively, and second terminals that are coupled to a common input terminal of the sensor signal detection circuitry 616 to provide corresponding the optical detector signal from the photodetector 614 and the capacitive sensing signal from the sensing top electrode 608 to the sensor signal detection circuitry 616. When the switch 610 is turned off (CAP_EN=0) and the switch 612 is turned on (Optical_en=1), the sensor signal detection circuitry 616 acquires the optical detector signal representing the optical image of the scanned fingerprint received at the particular hybrid sensing pixel. The sensor signal detection circuitry 616 can acquire the capacitive sensing signal representing the capacitive image of the scanned fingerprint when switch 610 CAP_EN=1 and Optical_en=0. After both the optical and capacitive images are acquired, both images can be processed in downstream circuitry separately and in combination to identify the fingerprint characteristics.

With the two modality of imaging by the above hybrid sensing pixels, the performance of the fingerprint identification can be enhanced by making use of the two types of the images in different ways. This enhanced fingerprint identification can be achieved by the sensor device processor, such as sensor device processor 621, for processing the pixel output signals from the hybrid sensing pixels to extract the fingerprint information. For example, the capacitive image can provide a 3D image on the depth of the ridges and valleys of the fingerprint features. Complementing the 3D capacitive image, the optical image can provide a high resolution 2D information on the fingerprint characteristics. The optical 2D image having a higher spatial resolution can be used to recover the capacitive sensing image resolution because both images information on the same ridges of the fingerprint. In some implementations where the capacitive sensing method may be more sensitive and accurate on identifying the valleys of the fingerprint than the optical sensing method, the spatial resolution of images acquired using the capacitive sensing method can degrade based on the thickness of the cover. This aspect of the capacitive sensing can be supplemented by the optical sensing. In operation, the sensor response may be fixed and the point spread function of the capacitive sensor may be fixed for all sensor positions. The higher resolution optical sensing can be used as a resolution recover method and can be applied on the capacitive sensing image to enhance the 3D image. A partial high resolution image from optical sensing can be available to help with the recovering method. Thus, the 3D capacitive image can be enhanced to provide more information on the valleys and ridges by interpolating or recovering based on the high resolution 2D image.

The enhanced 3D image can provide an improved fingerprint recognition and matching. In another example, the optical and capacitive images can be stored together to provide two comparisons each time a fingerprint recognition or matching is performed. The use of two types of images for comparison enhances the accuracy and security of the fingerprint sensing system.

The sensor signal detection circuitry 616 can be implemented in various ways using a number different circuitry designs. In one example, integrator sensing circuitry 618 can be implemented to store the electric charges caused by ridges and valleys touching or being substantially near the cover of the fingerprint sensor device of the cover of the mobile device. The inclusion of the integrator circuitry 618 enhances the signal-to-noise ratio (SNR). The integrator sensing circuitry includes an operational amplifier 622 to amplify a sensor signal, such as a capacitance related or optical related signal (e.g., voltage signal), detected by the sensing top electrode 608 or the photodetector 614 of the exemplary sensor pixel 600. The sensing top electrode 608 that include a conductive material, such as one of a variety of metals is electrically connected to a negative or inverting terminal 628 of the amplifier 622 through the switch 610. The sensing top electrode 608 and a local surface of the finger 202 function as opposing plates of a capacitor Cf 602. The capacitance of the capacitor Cf 602 varies based on a distance 'd' between the local surface of the finger 202 and the sensing top electrode 608, the distance between the two plates of the capacitor Cf 602. The capacitance of capacitor Cf 602 is inversely proportional to the distance 'd' between the two plates of the capacitor Cf 602. The capacitance of capacitor Cf 602 is larger when the sensing top electrode 608 is opposite a ridge of the finger 202 than when opposite a valley of the finger 202.

In addition, various parasitic or other capacitors can be formed between different conductive elements in the exemplary sensor pixel 600. For example, a parasitic capacitor CP 604 can form between the sensing top electrode 608 and a device ground terminal 605. Device ground is coupled to earth ground closely. Another capacitor Cr 624 can form between an output conductor of the amplifier 622 and the negative or inverting terminal 628 of the amplifier 622 and functions as a feedback capacitor to the amplifier 622. Also, a switch 626 can be coupled between the output of the amplifier 622 and the negative or inverting terminal 628 of the amplifier 622 to reset the integrator circuitry 618.

The positive terminal of the amplifier 622 is electrically connected to an excitation signal Vref. The excitation signal Vref can be directly provided to the positive terminal of a dedicated amplifier in each sensor pixel. By providing the excitation signal Vref directly to the positive terminal of the amplifier 622, the exemplary sensor pixel 600 becomes an active sensor pixel. In addition, providing the excitation signal Vref directly to the positive terminal of the amplifier 622 eliminates the need to include an excitation electrode, common to all sensor pixels, which reduces a conductive (e.g., metal) layer from the semiconductor structure of the sensor chip. In some implementations, an optional excitation electrode 606 can be implemented to enhance the SNR based on the design of the sensor pixel. In addition, by providing the excitation signal Vref 630 directly to the amplifier 622, the excitation signal Vref 622 is not applied directly to the finger 202 to avoid potentially irritating or injuring the finger 202. Moreover, when the excitation electrode for applying the excitation signal directly to the finger is not used, all components of the fingerprint sensor device can be integrated into a single packaged device, and the entire fingerprint sensor device can be disposed under the protective cover glass. With the entire fingerprint sensor device disposed under the protective cover glass, the fingerprint sensor device is protected from the finger and other external elements that can potentially damage the fingerprint sensor.

In FIG. 13A, the output signal (optical and capacitive) of the sensor signal detection circuitry 616 (e.g., Vpo of the amplifiers 622) in the sensor pixels 600 is electrically coupled to a switch 620 to selectively output the output signal Vpo from the sensor pixel 600 to a signal processing circuitry including a filter. The switch 620 can be implemented using a transistor or other switching mechanisms and electrically coupled to a controller to control the switching of the switch 620. By controlling the switches 620, 610 and 612, the sensor pixels in an array of sensor pixels can be selectively switched between acquiring the optical signals and the capacitive signals. In one implementation, the optical or capacitive signal can be acquired for each line, row or column of sensor pixels in the array and then switched to acquire the other type of signal for the line, row or column. The switching between the optical and capacitive signal acquisition can be performed line-by-line. In another implementation, one type of signal (capacitive or optical) can be acquired for all sensor pixels or elements in the array and then switched to acquire the other type of signal for all of the sensor pixels or elements. Thus, the switching between acquisition of different signal types can occur for the entire array. Other variations of switching between acquisition of the two types of sensor signals can be implemented.

Figure 13B:
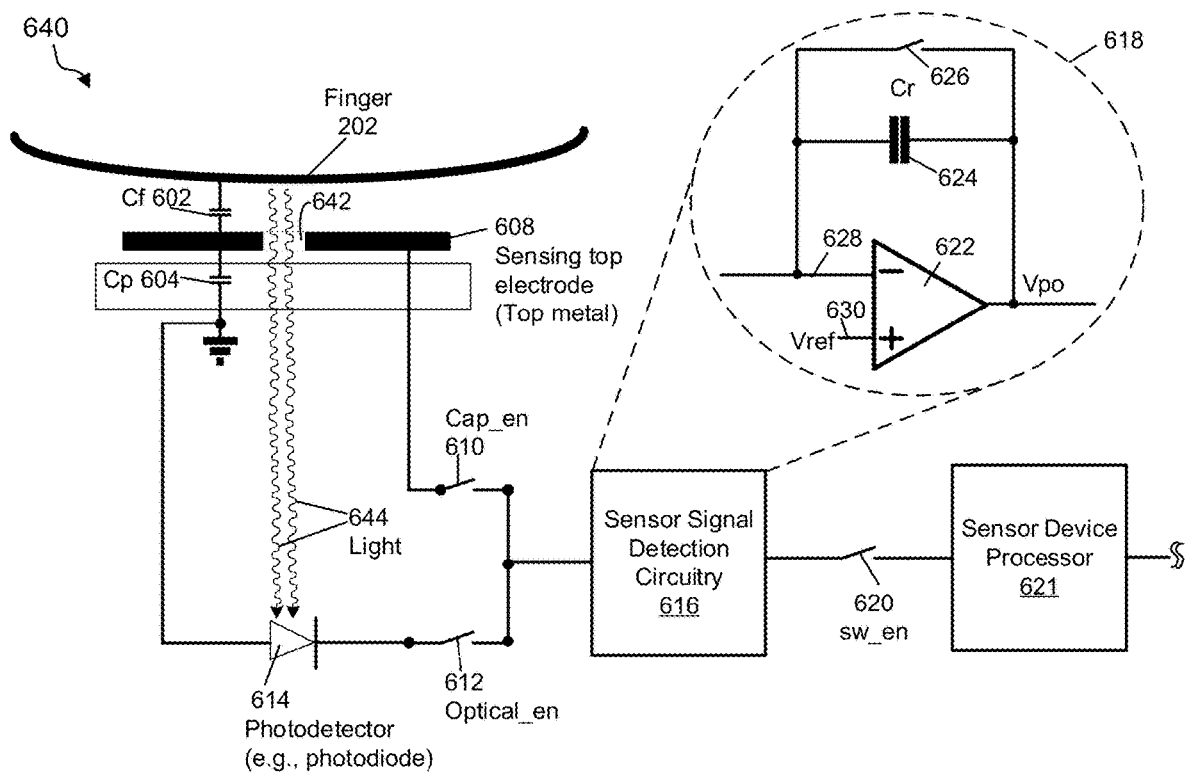
FIG. 13B illustrates a circuit diagram for another exemplary hybrid fingerprint sensing element or pixel.

FIG. 13B illustrates a circuit diagram for another exemplary hybrid fingerprint sensing element or pixel 640. The hybrid fingerprint sensing element or pixel 640 is substantially the same as the hybrid fingerprint sensing element or pixel 600 with respect to the components having the same reference number. For descriptions of the common components having the same reference number, refer to the description of FIG. 13A.

The hybrid fingerprint sensing element or pixel 640 implements the sensing top electrode 608 to include a hole or opening 642 that functions as a collimator to focus or narrow the reflected light 644 toward the photodetector 614 (e.g., photodiode). The photodetector 614 can be positioned or disposed below the collimator implemented using the sensing top electrode 608 to capture the reflected light 644 focused by the collimator 608.

Figure 13C:
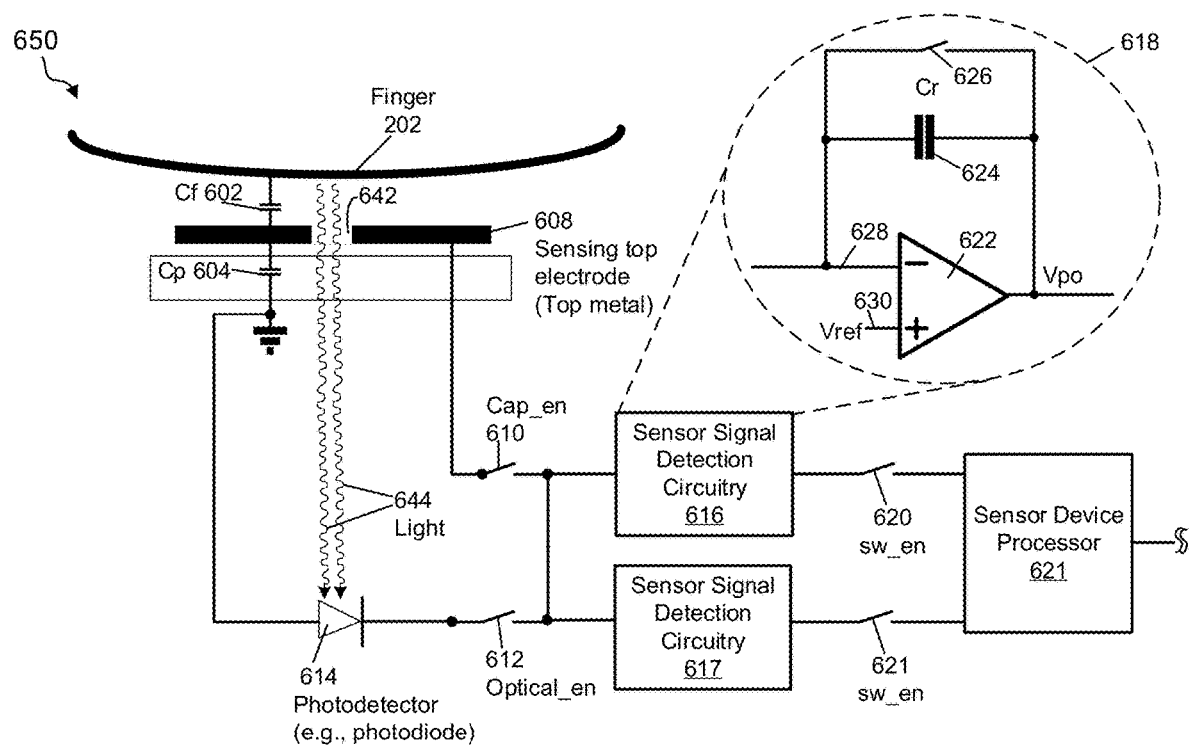
FIG. 13C illustrates a circuit diagram of an exemplary hybrid fingerprint sensing element or pixel for performing parallel detection of sensor signals from a hybrid fingerprint sensing element or pixel.
Figure 14A:
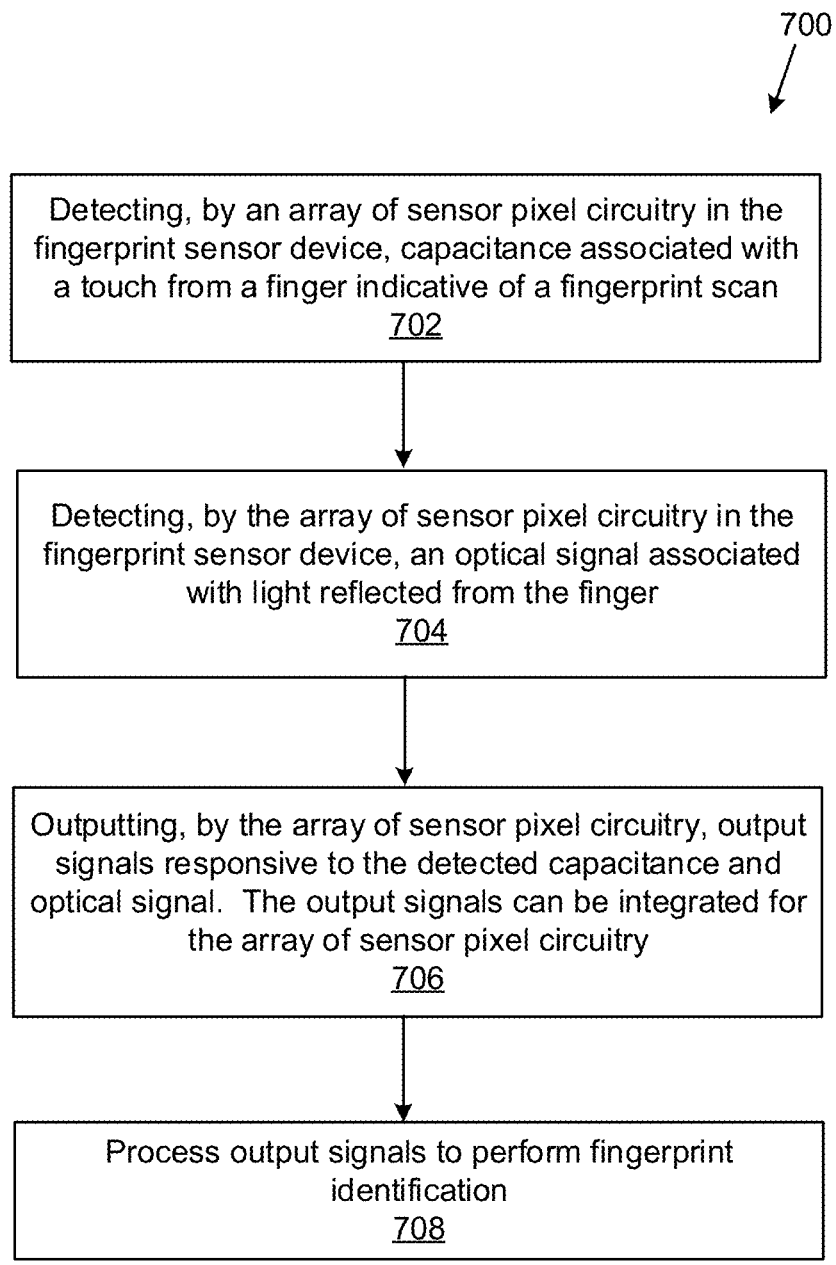
FIGS. 14A, 14B, 14C and 14D show process flow diagrams of an exemplary process for performing fingerprint sensing by a hybrid fingerprint sensor that incorporates optical and capacitive sensors.
Figure 14B:
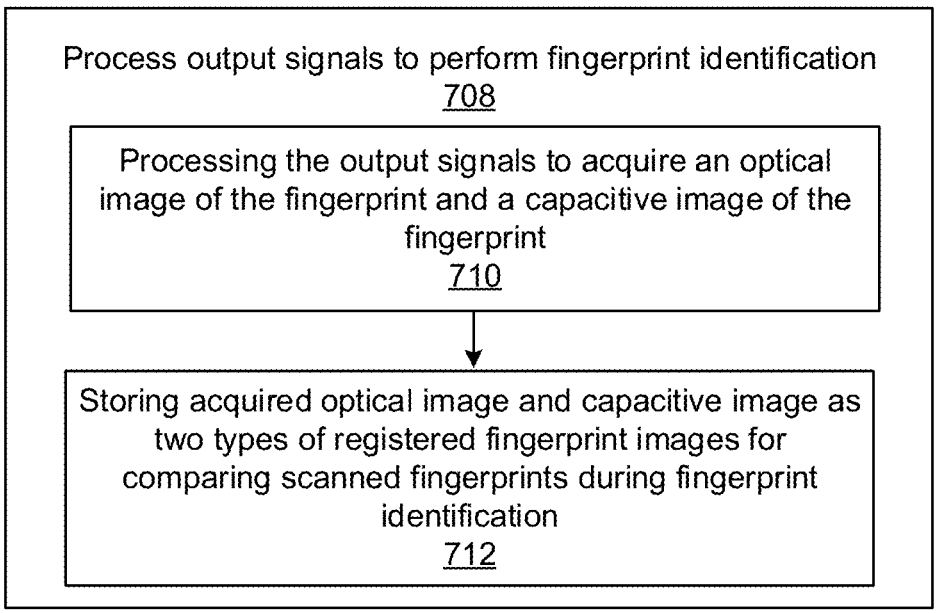
Figure 14C:
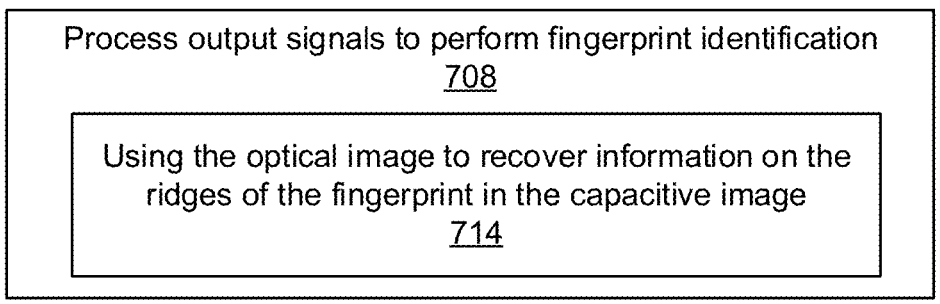
Figure 14D:
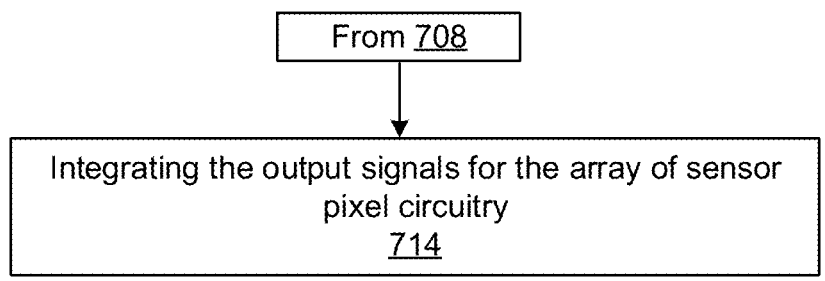

In some implementations, separate instances of sensor signal detection circuitry can be included for the optical and capacitive sensors to detect in parallel the sensor signals from both a photodetector and a capacitive sensor plate. FIG. 13C illustrates a circuit diagram of an exemplary hybrid fingerprint sensing element or pixel 650 for performing parallel detection of sensor signals from the photodetector and the capacitive sensor plate. The hybrid fingerprint sensing element or pixel 650 is substantially the same as the hybrid fingerprint sensing element or pixel 640 with respect to the components having the same reference number. For descriptions of the common components having the same reference number, refer to the description of FIG. 13A.

To perform sensor signal detection from both the capacitive plate and the photodetector in parallel, the hybrid fingerprint sensing element or pixel 650 includes separate sensor signal detection circuitry 616 and 617 communicatively coupled to the sensing top electrode 608 and the photodetector 624 respectively. Sensor signal detection circuitry 617 can be implemented to be substantially similar to sensor signal detection circuitry 616. In some implementations, switches 610 and 612 can be disposed to have first terminals that are electrically coupled to the sensing top electrode 608 and the photodetector 614, respectively, and second terminals that are coupled to respective sensor signal detection circuitry 616 and 617 to provide the optical detector signal from the photodetector 614 and the capacitive sensing signal from the sensing top electrode 608 to the sensor signal detection circuitry 616 and 617 respectively When the switches 610 and 612 are turned on and off together, the sensor signal detection circuitry 616 and 617 can perform sensor signal detection from the capacitive plate 608 and the photodetector 614 in parallel. When the switches 610 and 612 are turned on and off out of phase with each other, the sensor signal detection circuitry 616 and 617 can perform sensor signal detection from the capacitive plate 608 and the photodetector 614 in series. In addition, the sensor device processor 621 can be communicatively coupled to the sensor signal detection circuitry 616 and 617 either directly or indirectly through switches 620 and 621 to process the detected sensor signals from the capacitive plate 608 and the photodetector 614 in parallel or in series.

In another aspect of the disclosed technology, the optical sensor described with respect to FIGS. 11A, 11B, 12, 13A and 13B can be used to measure human heart beat by measuring the reflected light intensity change with time caused by blood flow variations in fingers due to the heart beat and pumping actions of the heart. This information is contained in the received light that is reflected, scattered or diffused by the finger and is carried by the optical detector signal. Thus, the optical sensor can serve multiple functions including acquiring an optical image of the fingerprint and to measure human heart beat. In implementations, a sensor device processor is used to process one or more optical detector signals to extract the heart beat information. This sensor device processor may be the same sensor device processor that processes the pixel output signals from optical sensing pixels or hybrid sensing pixels to extract the fingerprint information.

FIGS. 14A, 14B, 14C and 14D show process flow diagrams of an exemplary process 700, for performing fingerprint sensing by a hybrid fingerprint sensor that incorporates optical and capacitive sensors. A method 700 performed by a fingerprint sensor device includes detecting, by an array of sensor pixel circuitry in the fingerprint sensor device, capacitance associated with a touch from a finger indicative of a fingerprint scan (702). The method includes detecting, by the array of sensor pixel circuitry in the fingerprint sensor device, an optical signal associated with light reflected from the finger (704). The method 700 includes outputting, by the array of sensor pixel circuitry, output signals responsive to the detected capacitance and optical signal (706). The output signals can be processed to perform fingerprint identification (708). Processing the output signals (708) can include processing the output signals to acquire an optical image of the fingerprint and a capacitive image of the fingerprint (710). The acquired optical image and capacitive image can be stored as two types of registered fingerprint images for comparing scanned fingerprints during fingerprint identification (712). Processing the output signals (708) can include using the optical image to recover information on the ridges of the fingerprint in the capacitive image (714). The output signals can be integrated for the array of sensor pixel circuitry (716). Integrating can include integrating by all of the sensor pixel circuitry in the array the output signals in parallel.

While this patent document contains many specifics, these should not be construed as limitations on the scope of any application or of what may be claimed, but rather as descriptions of features that may be specific to particular embodiments of particular applications. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A fingerprint sensor device, comprising:
sensing circuitry configured to generate a sensor signal responsive to detecting a contact input associated with a fingerprint, the sensing circuitry including:
a fingerprint sensor configured to detect the contact input and generate a signal indicative of an image of the fingerprint, and
a live finger sensor configured to generate a signal indicative of an identification of the fingerprint as belonging to a live finger;
wherein the live finger sensor detects light scattered from the object responsive to the applied one or more wavelengths of light by a photodetector;
the light scattered from a finger includes information on the finger material, including the blood cells, the heartbeat, or the blood flow induced speckle patterns, or Doppler frequency change;
the generated sensor signal includes the signal indicative of the image of the fingerprint and the signal indicative of the identification of the fingerprint as belonging to a live finger; and
processing circuitry communicatively coupled to the sensing circuitry to process the generated sensor signal to determine whether the contact input associated with the fingerprint belongs to a live finger.

2. The fingerprint sensor device of claim 1, wherein the fingerprint sensor includes a capacitive sensor, an optical sensor, or both capacitive and optical sensors.

3. The fingerprint sensor device of claim 1, wherein the live finger sensor includes a light source and a light detector;
wherein the light source is configured to emit light toward a source of the fingerprint; and the light detector is configured to detect scattered light that is scattered from the source of the fingerprint responsive to the emitted light.

4. The fingerprint sensor device of claim 3, wherein the live finger sensor is configured to analyze the signal indicative of the image of the fingerprint to identify dynamic changes in image details over a period of time.

5. An electronic device, comprising:
a protective cover; and
a fingerprint sensor disposed near the protective cover, the fingerprint sensor includes:
a fingerprint sensor chip to scan a fingerprint; and
a live finger sensor to generate a signal indicative of an identification of the fingerprint as belonging to a live finger, wherein the live finger sensor includes:
a light source to emit light of one or more wavelengths toward the source of the fingerprint, and
a light detector to detect scattered light that is scattered from the source of the fingerprint responsive to the emitted light, wherein the detected scattered light includes the information indicative of whether the source of the fingerprint is a live finger; and
wherein the live finger sensor detects light scattered from the object responsive to the applied one or more wavelengths of light by a photodetector;
the light scattered from a finger includes information on the finger material, including the blood cells, the heartbeat, or the blood flow induced speckle patterns, or Doppler frequency change.

6. The electronic device of claim 5, wherein the fingerprint sensor includes:
a pressure sensor.

7. The electronic device of claim 5, wherein the light source is integrated with the fingerprint sensor chip.

8. The electronic device of claim 5, wherein the protective cover includes glass material that is at least partially transparent to the emitted light and the scattered light.

9. The electronic device of claim 8, wherein the glass cover includes a emitted light path window for the emitted light from the light source to travel to the source of the fingerprint; and
a scattered light path window for the scattered light from the source of the fingerprint to be received by the light detector.

10. The electronic device of claim 5, wherein the fingerprint sensor device includes a colored epoxy material layer disposed over the fingerprint sensor chip.

11. The electronic device of claim 5, wherein the fingerprint sensor device includes a metal ring structure disposed to surround the fingerprint sensor chip and under the colored epoxy material layer.

12. The electronic device of claim 5, wherein the protective cover is disposed to form a hole to receive the fingerprint sensor device within the hole of the protective cover.

13. The electronic device of claim 12, wherein the fingerprint sensor device includes a metal ring, and the fingerprint sensor device is disposed within the hole of the protective cover to form a gap between the metal ring and a side surface of the protective cover, wherein the gap form a light path for the emitted light emitted by the light source to reach the source of the fingerprint.

14. The electronic device of claim 13, wherein the fingerprint sensor device includes a sensor cover, the sensor cover is at least partially transparent to the emitted light and the scattered light.

15. The electronic device of claim 14, wherein the sensor cover includes two layers of a material that is at least partially transparent to the emitted light and the scattered light.

16. The electronic device of claim 15, wherein the sensor cover includes a color layer between the two layers of the material that is at least partially transparent to the emitted light and the scattered light.

17. The electronic device of claim 16, wherein the sensor cover includes a mesh material.

18. The electronic device of claim 16, wherein the fingerprint sensor includes:
flexible printed circuit (FPC) disposed over the pressure sensor and an integrated circuit board disposed over the FPC.

19. A method of detecting a live finger during a fingerprint scan, comprising:
detecting, by a fingerprint sensor, a contact input associated with a source of a fingerprint;
generating an image signal from the fingerprint sensor responsive to the detected contact input, wherein the generated image signal from the fingerprint sensor is indicative of one or more images of the fingerprint;
generating, by a live finger sensor, a live finger detection signal indicative of whether a source of the fingerprint making the contact is a live finger; and
processing, by processing circuitry, the generated image signal and the live finger detection signal to determine whether the detected contact and the associated one or more fingerprint images are from a live finger;
wherein the live finger sensor detects light scattered from the object responsive to the applied one or more wavelengths of light by a photodetector;
the light scattered from a finger includes information on the finger material, including the blood cells, the heartbeat, or the blood flow induced speckle patterns, or Doppler frequency change.

20. The method of claim 19, wherein the live finger sensor is configured to analyze the signal indicative of the image of the fingerprint to identify dynamic changes in image details over a period of time.

* * * * *